United States Patent
Coban et al.

(10) Patent No.: US 9,143,781 B2
(45) Date of Patent: Sep. 22, 2015

(54) WEIGHTED PREDICTION PARAMETER CODING

(71) Applicant: QUALCOMM Incorporated, San Diego, CA (US)

(72) Inventors: Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 13/830,484

(22) Filed: Mar. 14, 2013

(65) Prior Publication Data

US 2013/0259130 A1   Oct. 3, 2013

Related U.S. Application Data

(60) Provisional application No. 61/619,856, filed on Apr. 3, 2012.

(51) Int. Cl.
*H04N 19/503* (2014.01)
*H04N 19/70* (2014.01)
*H04N 19/463* (2014.01)
*H04N 19/577* (2014.01)

(52) U.S. Cl.
CPC ....... *H04N 19/00575* (2013.01); *H04N 19/463* (2014.11); *H04N 19/70* (2014.11); *H04N 19/577* (2014.11)

(58) Field of Classification Search
None
See application file for complete search history.

(56) References Cited

U.S. PATENT DOCUMENTS

| | | | |
|---|---|---|---|
| 8,270,483 B1 | 9/2012 | Zhang et al. | |
| 2008/0137742 A1 | 6/2008 | Chen et al. | |
| 2009/0207919 A1 | 8/2009 | Yin et al. | |
| 2013/0251044 A1* | 9/2013 | Lim et al. | 375/240.16 |

FOREIGN PATENT DOCUMENTS

| | | |
|---|---|---|
| WO | 2011019384 A1 | 2/2011 |
| WO | 2012031107 A1 | 3/2012 |
| WO | 2012067966 A1 | 5/2012 |

OTHER PUBLICATIONS

International Preliminary Report on Patentability from International Application No. PCT/US2013/032383, dated Mar. 6, 2014, 18 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Dave Czekaj
*Assistant Examiner* — Nam Pham
(74) *Attorney, Agent, or Firm* — Shumaker & Sieffert, P.A.

(57) ABSTRACT

The techniques are generally related to the coding of weighted prediction parameters. A video coder may determine the weighted prediction parameters for a reference picture list based on coded weighted prediction parameters for another reference picture list. Examples of the reference picture list include reference picture lists constructed for coding purposes, including a combined reference picture list.

25 Claims, 5 Drawing Sheets

(56) References Cited

OTHER PUBLICATIONS

Bross et al., "High Efficiency Video Coding (HEVC) text specification Working Draft 5", JCT-VC Meeting; MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-G1103, XP030111032, 238 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Coban, "On definition of ref_pic_list_combination_flag", MPEG Meeting; Geneva; (Motion Picture Expert Group or ISO/IEC JTC1/SC29/VVG11) No. m24665, Apr. 27-May 7, 2012, XP030053008, 2 pp.

Hendry et al., "Comments on Reference Picture Lists Combination Syntax", JCT-VC Meeting; MPEG Meeting; San Jose; (Joint Collaborative Team on Video Coding of ISO/IEC JTC1/SC29/WG11 and ITU-T SG.16 ) 5 No. JCTVC-H0504, Feb. 1-10, 2012, XP030111531, 6 pp.

International Search Report and Written Opinion—PCT/US2013/032383—ISA/EPO—Jun. 3, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

\* cited by examiner

| RefPicList0 | |
|---|---|
| Index | POC value |
| 0 | 4 |
| 1 | 3 |
| 2 | 2 |
| 3 | 1 |

| RefPicList1 | |
|---|---|
| Index | POC value |
| 0 | 4 |
| 1 | 3 |
| 2 | 2 |
| 3 | 1 |

FIG. 2A

| RefPicList0 | |
|---|---|
| Index | POC value |
| 0 | 5 |
| 1 | 6 |
| 2 | 7 |
| 3 | 8 |
| 4 | 9 |

| RefPicList1 | |
|---|---|
| Index | POC value |
| 0 | 5 |
| 1 | 6 |

FIG. 2B

WEIGHTED PREDICTION PARAMETER CODING

This application claims the benefit of U.S. Provisional Application 61/619,856 filed Apr. 3, 2012, the entire content of which is incorporated herein by reference.

TECHNICAL FIELD

This disclosure relates to video coding, and particularly, to techniques for weighted prediction parameter coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure is related to techniques for coding weighted prediction parameters. The weighted prediction parameters may indicate a scaling factor to apply to pixel values of reference pictures that can be used to inter-predict a block of a current picture. A video coder identifies the reference pictures in one or two reference picture lists. In some examples, if the two reference picture lists are substantially equivalent, the video coder may code weighted prediction parameters for one of the two reference picture lists, and determine the weighted prediction parameters for the other reference picture list based on the coded weighted prediction parameters.

In some examples, the video coder may construct a combined reference picture list from the two reference picture lists. In these examples, the video coder may code the weighted prediction parameters for the combined reference picture list, and determine the weighted prediction parameters for the two reference picture lists from the coded weighted prediction parameters for the combined reference picture list.

In one example, the disclosure describes a method for coding video data. The method comprising coding weighted prediction parameters for a first list, wherein the first list includes reference pictures used for inter-predicting one or more blocks within a current picture, determining weighted prediction parameters for a second list based on the weighted prediction parameters for the first list, wherein the second list includes reference pictures used for inter-predicting one or more blocks within the current picture, and inter-predicting a block in the current picture based at least on one or more of the weighted prediction parameters that are coded and the determined weighted prediction parameters.

In one example, the disclosure describes a device for coding video data. The device comprising a video coder configured to code weighted prediction parameters for a first list, wherein the first list includes reference pictures used for inter-predicting one or more blocks within a current picture, determine weighted prediction parameters for a second list based on the weighted prediction parameters for the first list, wherein the second list includes reference pictures used for inter-predicting one or more blocks within the current picture, and inter-predict a block in the current picture based at least on one or more of the weighted prediction parameters that are coded and the determined weighted prediction parameters.

In one example, the disclosure describes a computer-readable storage medium having instructions stored thereon that when executed cause one or more processors of a device for video coding to code weighted prediction parameters for a first list, wherein the first list includes reference pictures used for inter-predicting one or more blocks within a current picture, determine weighted prediction parameters for a second list based on the weighted prediction parameters for the first list, wherein the second list includes reference pictures used for inter-predicting one or more blocks within the current picture, and inter-predict a block in the current picture based at least on one or more of the weighted prediction parameters that are coded and the determined weighted prediction parameters.

In one example, the disclosure describes a device for coding video data, the device comprising means for coding weighted prediction parameters for a first list, wherein the first list includes reference pictures used for inter-predicting one or more blocks within a current picture, means for determining weighted prediction parameters for a second list based on the weighted prediction parameters for the first list, wherein the second list includes reference pictures used for inter-predicting one or more blocks within the current picture, and means for inter-predicting a block in the current picture based at least on one or more of the weighted prediction parameters that are coded and the determined weighted prediction parameters.

In one example, the disclosure describes a method for coding video data, the method comprising constructing a first reference picture list, constructing a second reference picture list, coding at least a first syntax element that indicates whether the first reference picture list is identical to the second reference picture list, when the first syntax element indicates that the first reference picture list is identical to the second reference picture list, coding weighted prediction parameters for reference pictures identified in the first reference picture list, and not coding weighted prediction parameters for reference pictures identified in the second reference picture list, and when the first syntax element indicates that the first reference picture list is identical to the second reference picture list, predicting a video block from at least one reference picture identified in the first reference picture list and based on a weighted prediction parameter for that reference picture.

In one example, the disclosure describes a method for coding video data, the method comprising coding at least a first syntax element that indicates whether a first N elements of a first reference picture list and a second reference picture list are the same, when the first N elements are the same, coding information that indicates a size of the first reference picture list and a size of the second reference picture list, when the size of the first reference picture list is greater than the size of the second reference picture list: constructing the first reference picture list, and deriving the second reference picture list from the first reference picture list, and when the size of the second reference picture list is greater than the size of the first reference picture list: constructing the second reference picture list, and deriving the first reference picture list from the second reference picture list.

The details of one or more examples are set forth in the accompanying drawings and the description below. Other features, objects, and advantages will be apparent from the description and drawings, and from the claims.

BRIEF DESCRIPTION OF DRAWINGS

FIGS. 2A and 2B are conceptual diagrams illustrating examples of substantially equivalent reference picture lists.

DETAILED DESCRIPTION

Figure 1:
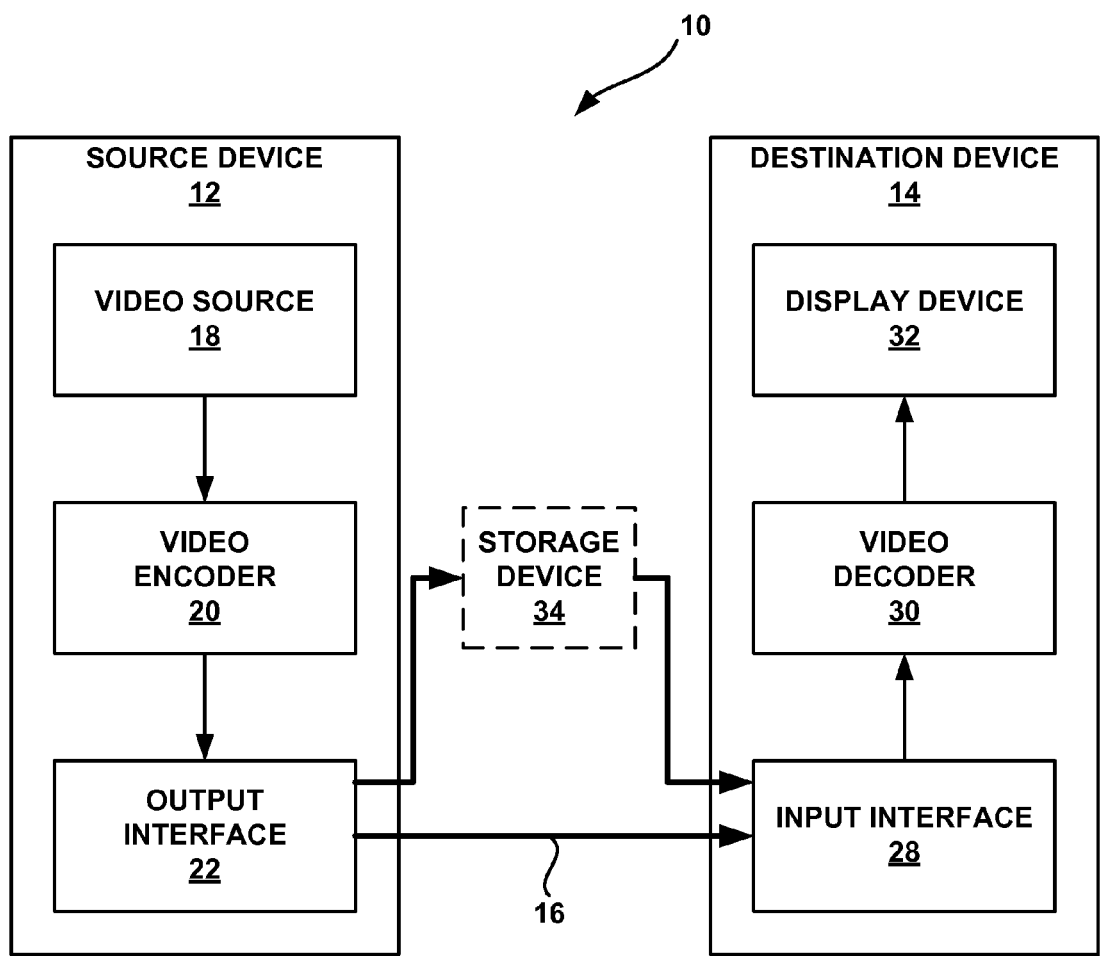
FIG. 1 is a block diagram illustrating an example video encoding and decoding system in accordance with one or more examples described in this disclosure.

A video coder (e.g., video encoder or video decoder) may intra-predict (e.g., intra-predict encode or intra-predict decode) one or more blocks within a picture or inter-predict one or more blocks within the picture. To inter-predict blocks (e.g., inter-predict encode blocks or inter-predict decode blocks) within the picture, the video coder constructs one or two reference picture lists (RefPicList0 and RefPicList1). Each of RefPicList0 and RefPicList1 indicates reference pictures that can potentially be used for inter-predicting a block in the current picture. For example, if the block is uni-predicted (e.g., predicted with one reference picture), the video coder may determine a motion vector for the block, and determine a reference picture to which the motion vector refers. Either RefPicList0 or RefPicList1 may identify the reference picture to which the uni-directional motion vector refers. If the block is bi-predicted (e.g., predicted with two reference pictures), the video coder may determine two motion vectors for the block (i.e., one for each reference picture). The video coder may also determine a reference picture in RefPicList0 to which a first motion vector refers and a reference picture in RefPicList1 to which a second motion vector refers. For either the uni-predicted or bi-predicted example, the video coder may inter-predict the block of the current picture based on the block or blocks referred to by the motion vector or vectors in the reference picture or pictures.

In addition, in some examples, the video coder may determine a weighted prediction parameter for each of the reference pictures in each of the reference picture lists. The weighted prediction parameter may define a scaling factor by which pixel values within a reference picture are to be scaled for inter-predicting the block in the current picture. The techniques described in this disclosure provide for efficient ways of determining the weighted prediction parameters for reference pictures in each of the reference picture lists.

For example, when the two reference picture lists are substantially equivalent, it may not be necessary for the video encoder to signal, in the coded bitstream, the weighted prediction parameters for both lists. Rather, the video encoder may signal, in the coded bitstream, the weighted prediction parameters for one of the substantially equivalent lists, and the video decoder may receive, from the coded bitstream, the weighted predicting parameters for one of the lists and determine the weighted prediction parameters for the other list based on the signaled weighted prediction parameters.

As one example, assume RefPicList0 and RefPicList1 are substantially equivalent. In this example, the video encoder may signal, in the coded bitstream, the weighted prediction parameters for RefPicList0, and the video decoder may determine the weighted prediction parameters for RefPicList1 based on the weighted prediction parameters for RefPicList0. In this way, the amount of data that needs to be signaled may be reduced because the weighted prediction parameters for both lists need not be signaled, and it may be sufficient to signal the weighted prediction parameters for only one of the lists.

There may be at least two instances when RefPicList0 and RefPicList1 are considered to be substantially equivalent. In one instance, RefPicList0 and RefPicList1 are considered to be substantially equivalent when RefPicList0 and RefPicList1 are identical. For RefPicList0 and RefPicList1 to be identical, RefPicList0 and RefPicList1 identify the exact same reference pictures and in the exact same order. In other words, RefPicList0 and RefPicList1 are copies of one another.

In another instance, RefPicList0 and RefPicList1 are considered to be substantially equivalent when the entirety or subset of one of the lists is identical to a subset of another one of the lists. For example, assume that RefPicList0 includes M entries (i.e., identifies M number of reference pictures) and RefPicList1 includes N entries (i.e., identifies N number of reference pictures). Also assume that M is greater than N. In this example, if the first N entries in RefPicList0 (i.e., a subset of RefPicList0) is identical to the N entries in RefPicList1 (i.e., the entirety of RefPicList1), in content and order, then RefPicList0 and RefPicList1 are considered to be substantially equivalent for purposes of determining weighted prediction parameters.

In some examples, when the video encoder determines that RefPicList0 and RefPicList1 are substantially equivalent, the video encoder may signal a flag, in the coded bitstream, that indicates that RefPicList0 and RefPicList1 are substantially equivalent. The video encoder may also signal, in the coded bitstream, the weighted prediction parameters for only one of the reference picture lists when RefPicList0 and RefPicList1 are substantially equivalent. In examples where RefPicList0 and RefPicList1 are substantially equivalent because the entirety or subset of one of the reference picture lists is identical to a subset of the other reference picture list, the video encoder may signal, in the coded bitstream, the weighted prediction parameters for the longer of the two reference picture lists (i.e., the reference picture list whose subset is identical to the entirety or subset of the other reference picture list).

The video decoder may receive, from the coded bitstream, the flag indicating that RefPicList0 and RefPicList1 are substantially equivalent, and may expect to receive only the weighted prediction parameters for one of the lists. The video decoder may set the received weighted prediction parameters equal for reference pictures in both RefPicList0 and RefPicList1 when RefPicList0 and RefPicList1 are substantially equivalent. For example, the video decoder may have already determined the sizes of RefPicList0 and RefPicList1. If the video decoder determines that the sizes of RefPicList0 and RefPicList1 are the same, and RefPicList0 and RefPicList1 are substantially equivalent, then the video decoder may set the received weighted prediction parameters equal to the weighted prediction parameters for both RefPicList0 and RefPicList1.

If, however, the video decoder determines that the sizes of RefPicList0 and RefPicList1 are not the same, and RefPicList0 and RefPicList1 are substantially equivalent, then the video decoder may expect to receive the weighted prediction parameters for the longer of the two lists. For instance, keeping with the previous example, if RefPicList0 is longer than RefPicList1, then the video decoder may expect to receive the weighted prediction parameters, from the coded bitstream, for RefPicList0. Then, the video decoder may set the weighted prediction parameters for the first N entries of RefPicList0 as equal to the corresponding N entries of RefPicList1 (i.e., set the subset of RefPicList0 equal to the entirety of RefPicList1 because the size of RefPicList1 is N).

In general, when RefPicList0 and RefPicList1 are substantially equivalent and RefPicList0 and RefPicList1 are of different sizes, the probability that RefPicList0 will be longer than RefPicList1 is greater than the probability that RefPicList1 is longer than RefPicList0. Accordingly, in some examples, the video encoder may signal, in the coded bitstream, the weighted prediction parameters only for one of the lists only when the sizes of RefPicList0 and RefPicList1 are the same, or when the size of RefPicList0 is longer than the size of RefPicList1, and not when the size of RefPicList1 is longer than the size of RefPicList0. This way, the video decoder may not need to determine for which list the video decoder received the weighted prediction parameters, from the coded bitstream, because the weighted prediction parameters, when RefPicList0 and RefPicList1 are substantially equivalent, will always be for RefPicList0.

In some examples, the techniques may exploit the use of a combined reference picture list (referred to as RefPicListC) for the efficient signaling of the weighted prediction parameters. In some examples, the video encoder and the video decoder may each construct respective reference picture Lists 0 and Lists 1. In addition, the video encoder and the video decoder may construct a combined reference picture list (i.e., RefPicListC) that is some combination of the reference pictures in constructed RefPicList0 and RefPicList1. In some examples, the video encoder and video decoder may utilize the RefPicListC to identify the reference picture or pictures that are used to inter-predict a block in the current picture.

In accordance with the techniques described in this disclosure, the video encoder may signal a flag, in the coded bitstream, that indicates whether RefPicListC is to be constructed, and the video decoder may or may not construct RefPicListC in response to the value of the flag. In examples where RefPicListC is to be constructed, the video encoder may signal, in the coded bitstream, the weighted prediction parameters for the reference pictures in RefPicListC, and not for the pictures in RefPicList0 and RefPicList1. In these examples, the video decoder may utilize the weighted prediction parameters for the reference pictures in RefPicListC to determine the weighted prediction parameters for the reference pictures in RefPicList0 and RefPicList1.

For example, the video decoder may have utilized some technique to construct RefPicListC from RefPicList0 and RefPicList1. Accordingly, the video decoder may have determined the mapping between the reference pictures identified in RefPicListC and the reference pictures identified in RefPicList0 and RefPicList1. In other words, because the video decoder constructed RefPicListC from RefPicList0 and RefPicList1, the video decoder may be able to determine whether a particular reference picture in RefPicListC came from RefPicList0 or RefPicList1. In this way, when the construction of RefPicListC is enabled, the video encoder may signal, in the coded bitstream, the weighted prediction parameters for the pictures in RefPicListC, rather than signaling the weighted prediction parameters for pictures in RefPicList0 and RefPicList1.

In some examples, the video encoder and video decoder may utilize any combination of the above examples (e.g., where RefPicList0 and RefPicList1 are substantially equivalent or where the construction of RefPicListC is enabled). For instance, the video encoder may signal a flag that indicates whether RefPicList0 and RefPicList1 are substantially equivalent, and signal a flag that indicates whether the construction of RefPicListC is enabled. In this example, the video encoder may signal the weighted prediction parameters for RefPicListC, and if RefPicList0 and RefPicList1 are substantially equivalent, and identical, then the video decoder may set the weighted prediction parameters for RefPicListC equal to the weighted prediction parameters for RefPicList0 and RefPicList1. If RefPicList0 and RefPicList1 are substantially equivalent, but not identical because the sizes are different (i.e., the subset of one is identical to the entirety or subset of the other), then RefPicListC may be equal to the longer of RefPicList0 or RefPicList1, which is generally RefPicList0.

As another example, the video encoder may only signal a flag that indicates whether RefPicList0 and RefPicList1 are substantially equivalent, but does not signal a flag that indicates whether RefPicListC is to be constructed or is not to be constructed. As yet another example, the video encoder may only signal a flag that indicates whether RefPicListC is to be constructed or is not to be constructed, and does not signal a flag that indicates whether RefPicList0 and List are substantially equivalent.

In any case, the video coder (e.g., encoder or decoder) may be configured to code (e.g., encode or decode) weighted prediction parameters for a first list. The video coder may determine weighted prediction parameters for a second list from coded signaling for the weighted prediction parameters for the first list. The first list may be one of a combined reference picture list (RefPicListC), a first reference picture list (RefPicList0), or a second reference picture list (RefPicList1).

FIG. 1 is a block diagram illustrating an example video encoding and decoding system in accordance with one or more examples described in this disclosure. For example, system 10 includes source device 12 and destination device 14. Source device 12 and destination device 14 are configured to implement the coding of video data in which source device 12 and destination device 14 each code pictures.

System 10 may operate in accordance with different video coding standards, a proprietary standard, or any other way of video coding, including techniques for multiview coding. The following describes a few examples of video coding standards, and should not be considered limiting. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a new video coding standard, namely High Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent working draft of HEVC, referred to as HEVC WD9 is available, as of Mar. 12, 2013, from http://phenix.int-evry.fr/jct/doc_end_user/documents/11_Shanghai/wg11/JCTVC-K1003-v10.zip. An earlier version of a working draft of HEVC, referred to as HEVC WD6 hereinafter, was available on Apr. 3, 2012, from http://phenix.int-evry.fr/jct/doc_end_user/documents/8_San%20Jose/wg11/JCTVC-H1003-v21.zip. For purposes of illustration only, the techniques described in this disclosure are described with examples in accordance with the H.264 and HEVC standards.

As shown in FIG. 1, system 10 includes a source device 12 that generates encoded video data to be decoded at a later time by a destination device 14. Source device 12 and destination device 14 comprise any of a wide range of devices, including a wireless handset such as so-called "smart" phones, so-called "smart" pads, or other such wireless devices equipped for wireless communication. Additional examples of source device 12 and destination device 14 include, but are not limited to, a digital television, a device in digital direct broadcast system, a device in wireless broadcast system, a personal digital assistants (PDA), a laptop computer, a desktop computer, a tablet computer, an e-book reader, a digital camera, a digital recording device, a digital media player, a video gaming device, a video game console, a cellular radio telephone, a satellite radio telephone, a video teleconferencing device, and a video streaming device, or the like.

Destination device 14 may receive the encoded video data to be decoded via a link 16. Link 16 comprises any type of medium or device capable of moving the encoded video data from source device 12 to destination device 14. In one example, link 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data is output from output interface 22 to a storage device 34. Similarly, encoded data is accessed from storage device 34 by input interface 28. Examples of storage device 34 include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 corresponds to a file server or another intermediate storage device that holds the encoded video generated by source device 12. In these examples, destination device 14 accesses stored video data from storage device 34 via streaming or download. The file server is any type of server capable of storing encoded video data and transmitting that encoded video data to the destination device 14. Example file servers include a web server (e.g., for a website), an FTP server, network attached storage (NAS) devices, or a local disk drive. Destination device 14 accesses the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions (e.g., via the Internet), encoding of digital video for storage on a data storage medium, decoding of digital video stored on a data storage medium, or other applications. In some examples, system 10 is configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 includes a modulator/demodulator (modem) and/or a transmitter. In source device 12, video source 18 includes one or more of a source such as a video capture device (e.g., a video camera), a video archive containing previously captured video, a video feed interface to receive video from a video content provider, and/or a computer graphics system for generating computer graphics data as the source video, a combination of such sources, or any other source. As one example, if video source 18 is a video camera, source device 12 and destination device 14 may form so-called camera phones or video phones. However, the techniques described in this disclosure are applicable to video coding in general, and may be applied to wireless and/or wired applications.

Video encoder 20 encodes the captured, pre-captured, or computer-generated video. Output interface 22 of source device 12 is configured to transmit the encoded video data to destination device 14. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 includes a receiver and/or a modem. Input interface 28 of destination device 14 receives the encoded video data over link 16 or from storage device 34. The encoded video data communicated over link 16, or provided on storage device 34, includes a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 includes an integrated display device and also configured to interface with an external display device. In other examples, destination device 14 is a display device. In general, display device 32 displays the decoded video data to a user, and comprises any of a variety of display devices such as a liquid crystal display (LCD), a plasma display, an organic light emitting diode (OLED) display, or another type of display device.

Video encoder 20 and video decoder 30 may operate according to various video coding standards, such as the examples listed above. However, the techniques described in this disclosure should not be considered limited as such. Other examples of video compression standards include MPEG-2 and ITU-T H.263. Proprietary coding techniques, such as those referred to as On2 VP6/VP7/VP8, may also implement one or more of the techniques described herein.

The techniques of this disclosure, however, are not limited to any particular coding standard. Moreover, even if the techniques described in this disclosure may not necessarily conform to a particular standard, the techniques described in this disclosure may further assist in coding efficiency relative to the various standards. Also, the techniques described in this disclosure may be part of future standards. For ease of understanding, the techniques are described with respect to the HEVC standard under development, but the techniques are not limited to the HEVC standard, and can be extended to other video coding standards or video coding techniques that are not defined by a particular standard.

Although not shown in FIG. 1, in some aspects, video encoder 20 and video decoder 30 are each integrated with an audio encoder and decoder, and include appropriate MUX-DEMUX units, or other hardware and software, to handle encoding of both audio and video in a common data stream or separate data streams. If applicable, in some examples, MUX-DEMUX units conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Video encoder 20 is configured to encode video data and video decoder 30 is configured to decode video data in accordance with techniques described in this disclosure.

A video sequence typically includes a series of video pictures. A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264 standard or largest coding units (LCUs), coding units (CUs), prediction units (PUs), or transform units (TUs), as defined in the HEVC standard. The video blocks may have fixed or varying sizes, and may differ in size according to a specified coding standard. Each video picture may include a plurality of slices. Each slice may include a plurality of blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-prediction coded (e.g., intra-predicted), the block may include data describing an intra-prediction mode for the block. As another example, when the block is inter-prediction coded (e.g., inter-predicted), the block may include information defining a motion vector for the block. The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to (e.g., ITU-T H.264/AVC). For example, whereas H.264 provides nine intra-prediction encoding modes, the HM may provide as many as thirty-three directional/angular intra-prediction encoding modes plus DC and Planar modes.

The working model of the HM describes that a video picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node (i.e., a coded video block). Syntax data associated with a coded bitstream may define a maximum number of times a treeblock may be split, and may also define a minimum size of the coding nodes. Treeblocks are referred to as LCUs in some examples.

A CU includes a coding node and prediction units (PUs) and transform units (TUs) associated with the coding node. A size of the CU corresponds to a size of the coding node and may square in shape. In some examples, the size of the CU ranges from 8×8 pixels up to the size of the treeblock with a maximum of 64×64 pixels or greater. In some examples, each CU contains one or more PUs and one or more TUs. Syntax data associated with a CU describe, for example, partitioning of the CU into one or more PUs. Partitioning modes differ between whether the CU is skip or direct mode encoded, intra-prediction mode encoded, or inter-prediction mode encoded. PUs can be partitioned to be non-square in shape, in some examples. Syntax data associated with a CU also describes, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this is not always the case. The TUs are typically the same size or smaller than the PUs. In some examples, residual samples corresponding to a CU are subdivided into smaller units using a quadtree structure known as "residual quad tree" (RQT). The leaf nodes of the RQT can be referred to as transform units (TUs). Pixel difference values associated with the TUs are transformed to produce transform coefficients, which are quantized, in some examples.

In general, a PU includes data related to the prediction process. For example, when the PU is intra-prediction coded, the PU includes data describing an intra-prediction mode for the PU. As another example, when the PU is inter-prediction coded, the PU includes data defining a motion vector for the PU. The data defining the motion vector for a PU describes, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList0 or RefPicList1) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In either the H.264 standard or the HEVC standard, following intra-prediction or inter-prediction coding, video encoder 20 calculates residual data for the TUs of the CU, in HEVC or for macroblock in H.264. The PUs comprise pixel data in the spatial domain (also referred to as the pixel domain) and the TUs comprise coefficients in the transform domain following application of a transform (e.g., a discrete cosine transform (DCT)), an integer transform, a wavelet transform, or a conceptually similar transform to residual video data. The residual data may correspond to pixel differences between pixels of the unencoded picture and prediction values corresponding to the PUs in HEVC or prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, to perform inter-prediction coding (e.g., inter-prediction encoding by video encoder 20 or inter-prediction decoding by video decoder 30), video encoder 20 and video decoder 30 may be configured to construct one or two reference picture lists (i.e., RefPicList0 and RefPicList1). For example, prior to decoding the blocks within a current picture, video decoder 30 may construct RefPicList0 and RefPicList1, where RefPicList0 and RefPicList1 identify reference pictures that video decoder 30 can potentially use to inter-predict blocks within the current picture (e.g., inter-prediction decode blocks within the current picture). There may be various ways in which video decoder 30 may construct RefPicList0 and RefPicList1 and the techniques described in this disclosure are not limited to any specific technique for constructing RefPicList0 and RefPicList1.

Video encoder 20 may also be configured to construct RefPicList0 and RefPicList1. For example, RefPicList0 and RefPicList1, on the video encoder 20 side, may identify the pictures that video encoder 20 can potentially use to inter-prediction encode blocks of a picture, and RefPicList0 and RefPicList1, on the video decoder 30 side, may identify the pictures that video decoder 30 can potentially use to inter-prediction decode blocks of a picture. The RefPicList0 and RefPicList1 that video encoder 20 constructs may be substantially similar to respective RefPicList0 and RefPicList1 that video decoder 30 constructs.

As described above, RefPicList0 and RefPicList1 identify reference pictures. In some examples, RefPicList0 and RefPicList1 may identify reference pictures with their picture order count (POC) value. A POC value is a unique identifier of a picture and indicates an order which pictures are outputted or displayed. For example, a picture with a smaller POC value is outputted or displayed earlier than a picture with a larger POC value. The POC value should not be confused with a coding order. For example, it is possible for a picture with a smaller POC value to be encoded or decoded later than a picture with a larger POC value.

In some examples, there may be weighted prediction parameter associated with each of the pictures identified in RefPicList0 and RefPicList1. The weighted prediction parameters indicate a scaling factor that video decoder 30 utilizes to scale the pixel values of pixels within the reference picture that are used for inter-predicting a block within the current picture (e.g., inter-prediction decoding the block within the current picture). For example, if the weighted prediction parameter for the first picture in RefPicList0 is 'x' and video decoder 30 is to use the first picture in RefPicList0 to inter-predict a block in the current picture, video decoder 30 may multiply the pixel values of the block in first picture in RefPicList0 that is used for inter-predicting, as indicated by the motion vector, with the value of x. Video decoder 30 may utilize the resulting values for inter-predicting the block of the current picture. The weighted prediction parameter may also define an offset that is added or subtracted after the pixel values are scaled.

Video encoder 20 may be configured to signal, in the coded bitstream, the weighted prediction parameters for the reference picture list(s) that video encoder 30 constructs. The following Table 1 illustrates one example of the syntax elements that video encoder 20 signals to video decoder 30 to signal the weighted prediction parameters. Table 1 is substantially similar to the table in section 7.3.3.8 of HEVC WD6. Section 7.3.8.4 of HEVC WD9 includes the latest weighted prediction parameter syntax, which is similar to the below table with differences due to the changes in the HEVC standard from HEVC WD6 to HEVC WD9.

TABLE 1

| PREDICTION WEIGHT TABLE SYNTAX | |
|---|---|
| pred_weight_table( ) { | Descriptor |
|   luma_log2_weight_denom | ue(v) |
|   if( chroma_format_idc != 0 ) | |
|     delta_chroma_log2_weight_denom | se(v) |
|   if( slice_type == P \|\| | |
|     ( slice_type == B && ref_pic_list_combination_flag == 0 ) ) | |
|   { | |
|     for( i = 0; i <= num_ref_idx_l0_active_minus1; i++ ) { | |
|       luma_weight_l0_flag | u(1) |
|       if( luma_weight_l0_flag ) { | |
|         delta_luma_weight_l0[ i ] | se(v) |
|         luma_offset_l0[ i ] | se(v) |
|       } | |
|       if( chroma_format_idc != 0 ) { | |
|         chroma_weight_l0_flag | u(1) |
|         if( chroma_weight_l0_flag ) | |
|           for( j =0; j < 2; j++ ) { | |
|             delta_chroma_weight_l0[ i ][ j ] | se(v) |
|             delta_chroma_offset_l0[ i ][ j ] | se(v) |
|           } | |
|       } | |
|     } | |
|   } | |
|   if( slice_type == B ) { | |
|     if( ref_pic_list_combination_flag == 0 ) { | |
|       for( i = 0; i <= num_ref_idx_l1_active_minus1; i++ ) { | |
|         luma_weight_l1_flag | u(1) |
|         if( luma_weight_l1_flag ) { | |
|           delta_luma_weight_l1[ i ] | se(v) |
|           luma_offset_l1[ i ] | se(v) |
|         } | |
|         if( chroma_format_idc != 0 ) { | |
|           chroma_weight_l1_flag | u(1) |
|           if( chroma_weight_l1_flag ) | |
|             for( j = 0; j < 2; j++ ) { | |

TABLE 1-continued

PREDICTION WEIGHT TABLE SYNTAX

| pred_weight_table( ) { | Descriptor |
|---|---|
|         delta_chroma_weight_l1[ i ][ j ] | se(v) |
|         delta_chroma_offset_l1[ i ][ j ] | se(v) |
|       } | |
|     } | |
|   } | |
| } else { | |
|   for( i = 0; i <= num_ref_idx_lc_active_minus1; i++ ) { | |
|     luma_weight_lc_flag | u(1) |
|     if( luma_weight_l1_flag ) { | |
|       delta_luma_weight_lc[ i ] | se(v) |
|       luma_offset_lc[ i ] | se(v) |
|     } | |
|     if( chroma_format_idc != 0 ) { | |
|       chroma_weight_lc_flag | u(1) |
|       if( chroma_weight_lc_flag ) | |
|         for( j = 0; j < 2; j++ ) { | |
|           delta_chroma_weight_lc[ i ][ j ] | se(v) |
|           delta_chroma_offset_lc[ i ][ j ] | se(v) |
|         } | |
|     } | |
|   } | |
| } | |
| } | |

In HEVC WD6, ref_pic_list_combination_flag is defined as follows.

ref_pic_list_combination_flag equal to 1 indicates that the reference picture RefPicList0 and the reference picture RefPicList1 are combined to be an additional reference picture list combination used for the prediction units being uni-directional predicted. This flag equal to 0 indicates that the reference picture RefPicList0 and reference picture RefPicList1 are identical, thus reference picture RefPicList0 is used as the reference picture list combination. The reference picture list combination is set to be empty at the start of the loop defined in Table 1.

The above describes the concept of a reference picture list combination (sometimes referred to as combined reference picture list or RefPicListC). Video decoder 30 may derive RefPicListC from RefPicList0 and RefPicList1. With RefPicListC, video encoder 20 does not need to specify whether a uni-directionally predicted block is to be predicted from a picture in RefPicList0 or a picture in RefPicList1, since video decoder 30 uses RefPicListC to inter-predict the uni-directionally predicted block.

In the above description of ref_pic_list_combination_flag, when ref_pic_list_combination_flag is equal to 0, RefPicList0 and RefPicList1 are identical. "Identical" means that RefPicList0 and RefPicList1 identify the exact same reference pictures, in the exact same order. For example, when RefPicList0 and RefPicList1 are identical, RefPicList0 and RefPicList1 are copies of one another.

When RefPicList0 and RefPicList1 are identical, there may be no need for video encoder 20 to signal parameters (e.g., weighted prediction parameters), in the coded bitstream, for both RefPicList0 and RefPicList1. Rather, it may be sufficient for video encoder 20 to signal parameters for one of RefPicList0 or RefPicList1, and video decoder 30 may determine that the signaled parameters can be used for both RefPicList0 and RefPicList1. In some cases, when RefPicList0 and RefPicList1 are identical, video encoder 20 may signal, in the coded bitstream, and video decoder 30 may receive, from the coded bitstream, parameters for RefPicList0.

When ref_pic_list_combination is equal to 1, RefPicList0 and RefPicList1 may be identical or may be different. If ref_pic_list_combination is equal to 1, video encoder 20 may signal, in the coded bitstream, and video decoder 30 may receive, from the coded bitstream, a number of entries for the combined reference picture list (RefPicListC). The syntax element that defines the number of entries in RefPicListC may be referred to as num_ref_idx_lc_active_minus1.

If ref_pic_list_combination is equal to 1, video encoder 20 may also signal in the coded bitstream and video decoder 30 may receive from the coded bitstream a syntax element that indicates the manner in which the combined reference picture list is to be constructed. This syntax element is referred to as ref_pic_list_modification_flag_lc. In some examples, the default value of ref_pic_list_modification_flag_lc is 0.

The following Table 2 illustrates one example of the syntax elements that video encoder 20 signals to video decoder 30 for the reference picture RefPicListCombination syntax. Table 2 is substantially similar to the table in section 7.3.3.3 of HEVC WD6.

TABLE 2

REFERENCE PICTURE LIST COMBINATION SYNTAX

| ref_pic_list_combination( ) { | Descriptor |
|---|---|
|   if( slice_type = = B ) { | |
|     ref_pic_list_combination_flag | u(1) |
|     if( ref_pic_list_combination_flag ) { | |
|       num_ref_idx_lc_active_minus1 | ue(v) |
|       ref_pic_list_modification_flag_lc | u(1) |
|       if( ref_pic_list_modification_flag_lc ) | |
|         for( i =0; i <= | |
|         num_ref_idx_lc_active_minus1; i++ ) { | |
|           pic_from_list_0_flag | u(1) |
|           if( ( pic_from_list_0_flag && | |
|             num_ref_idx_l0_active_minus1 > | |
|             0 ) \| \| | |
|             ( !pic_from_list_0_flag && | |
|             num_ref_idx_l1_active_minus1 > | |

TABLE 2-continued

REFERENCE PICTURE LIST COMBINATION SYNTAX

| ref_pic_list_combination( ) { | Descriptor |
|---|---|
|     0 ) | |
|     ref_idx_list_curr | ue(v) |
|    } | |
|   } | |
| } | |

The above examples described the concept of RefPicList0, RefPicList1, and RefPicListC. However, in HEVC WD9, the concept of a combined reference picture list (RefPicListC) is removed. Although RefPicListC has been removed from HEVC WD9, the techniques described in this disclosure are applicable to the HEVC standard. For example, the techniques described in this disclosure need not be limited to examples where syntax elements for the combined reference picture list are used. Rather, the techniques described in this disclosure may utilize other syntax elements, or utilize new syntax elements. Accordingly, description of the techniques with respect to the combined reference picture list is provided for purposes of illustration only and should not be considered limiting. Moreover, even though the combined reference picture list is removed from HEVC WD9, it may be possible for future standards to utilize the combined reference picture list concept.

As described above, the syntax element, ref_pic_list_combination_flag, being equal to 0 means that RefPicList0 and RefPicList1 are identical. Again, ref_pic_list_combination_flag is one example of a syntax element, and it may be possible for video encoder 20 to signal, in the coded bitstream, and video decoder 30 to receive, from the coded bitstream, another syntax element, not related to the combined reference picture list, that indicates whether RefPicList0 and RefPicList1 are identical (or substantially equivalent, as described in more detail).

However, as indicated in Table 1, video encoder 20 may signal the weighted prediction parameters for both RefPicList0 and RefPicList1 even when RefPicList0 and RefPicList1 are identical. This results in unnecessary signaling of weighted prediction parameters, which consumes bandwidth and increases processing time for video decoder 30. For example, when RefPicList0 and RefPicList1 are identical, there may be no need for video encoder 20 to signal the weighted prediction parameters for reference pictures in both lists. Instead, bandwidth and computational efficiencies may be realized if video encoder 20 signals, in the coded bitstream, the weighted prediction parameters for one of the reference picture lists, and the other reference picture list inherits the weighted prediction parameters.

For instance, if RefPicList0 and RefPicList1 are identical, then video encoder 20 may signal, in the coded bitstream, the weighted prediction parameters for the reference pictures of RefPicList0. Video decoder 30 may receive, from the coded bitstream, the weighted prediction parameters for the reference pictures in RefPicList0. In this case, video decoder 30 may not receive, from the coded bitstream, the weighted prediction parameters for the reference pictures in RefPicList1. Rather, video decoder 30 may determine the weighted prediction parameters for reference pictures in RefPicList1 based on the received weighted prediction parameters for RefPicList0. For example, video decoder 30 may copy the weighted prediction parameters for reference pictures in RefPicList0 as the weighted prediction parameters for reference pictures in RefPicList1. In this way, RefPicList1 inherits the weighted prediction parameters from RefPicList0.

Although the above example described video encoder 20 signaling, in the coded bitstream, the weighted prediction parameters for RefPicList0 when RefPicList0 and RefPicList1 are identical, the techniques described in this disclosure are not so limited. In some examples, when RefPicList0 and RefPicList1 are identical, video encoder 20 may signal, in the coded bitstream, the weighted prediction parameters for reference pictures in RefPicList1. Video decoder 30 may determine the weighted prediction parameters for reference pictures in RefPicList0 based on the weighted prediction parameters for RefPicList1 (e.g., copy the weighted prediction parameters). In this example, RefPicList0 inherits the weighted prediction parameters from RefPicList1.

Furthermore, in the above example, when RefPicList0 and RefPicList1 are "identical," video decoder 20 signals and video decoder 30 receives weighted prediction parameters for one of the two reference picture lists, and not for both. However, a requirement that RefPicList0 and RefPicList1 be identical is not necessary. In some examples, one of the reference picture lists may be a subset of the other reference picture list. For example, RefPicList0 may identify M number of reference pictures and RefPicList1 may identify N number of reference pictures. In other words, the size of RefPicList0 is different than the size of RefPicList1. In this example, assume that M is larger than N. In some cases, the first N entries of RefPicList0 may be identical to the N entries of RefPicList1 (i.e., a subset of RefPicList0 is identical to RefPicList1 in content and order).

In this case, when a subset of a first reference picture list is identical to the entirety or subset of a second reference picture list, video encoder 20 may signal a syntax element, in the coded bitstream, indicating that a subset of the first reference picture list is identical to the entirety or subset of the second reference picture list and signal the weighted prediction parameters for the longer reference picture list (e.g., the first reference picture list). Video decoder 30 may determine the weighted prediction parameters for the shorter reference picture list (e.g., the second reference picture list) based on the weighted prediction parameters for the longer reference picture list. If there are any leftover reference pictures, video encoder 20 may signal the weighted prediction parameters for the leftover reference pictures. For ease of illustration, the techniques are described with examples where a subset of one of the reference picture lists is identical to the entirety of the other reference picture list.

For instance, in constructing RefPicList0 and RefPicList1, video decoder 30 may have already determined the number of entries in RefPicList0 and RefPicList1 (e.g., M for RefPicList0 and N for RefPicList1). In this example, video decoder 30 may receive, from the coded bitstream, a syntax element indicating that a subset of RefPicList0 is equivalent to the entirety of RefPicList1, and may also receive, from the coded bitstream, the M weighted prediction parameters for RefPicList0 (and not receive from the coded bitstream the N weighted prediction parameters for RefPicList1). In this example, video decoder 30 may copy the first N weighted prediction parameters of the total M weighted prediction parameters that video decoder 30 received for RefPicList0, and set them as the weighted prediction parameters for the N entries of RefPicList1.

In the above example, the first N weighted prediction parameters of RefPicList0 were identical to the N weighted prediction parameters of RefPicList1. However, in some examples, a different subset (e.g., the middle N weighted prediction parameters) of RefPicList0 may be identical to the N weighted prediction parameters of RefPicList1. In these examples, video encoder 20 may signal and video decoder 30 may receive a syntax element that identifies the subset that is identical.

It should also be understood that RefPicList0 including a subset that is identical to the entirety of RefPicList1 is provided for purposes of illustration only, and should not be considered limiting. In some cases, a subset of RefPicList1 may be identical to the entirety of RefPicList0, and video encoder 20 may signal and video decoder 30 may receive the weighted prediction parameters for RefPicList1, from which video decoder 30 determines the weighted prediction parameters for RefPicList0.

In the examples described above, video encoder 20 may signal the weighted prediction parameters for a first reference picture list, and not for a second reference picture list, when the first reference picture list is identical to the second reference picture list, or when a subset of the first reference picture list is identical to the entirety of the second reference picture list. As used in this disclosure, the term "substantially equivalent" refers to examples where the two reference picture lists are identical, or to examples where a subset of one of the reference picture lists is identical to the entirety of the other reference picture list or a subset of the other reference picture. In other words, if a first reference picture list is substantially equivalent to a second reference picture list, then the first reference picture list is identical to the second reference picture list, or a subset of the first reference picture is identical to the entirety or subset of the second reference picture list. In some examples, bypass coding may be utilized when the two lists are substantially equivalent. Also, in examples, where a subset of one reference picture list is identical to a subset of another reference picture list, video encoder 20 may signal and video decoder 30 may receive weighted prediction parameters for any remaining reference pictures in the two reference picture lists.

In general, when RefPicList0 and RefPicList1 are substantially equivalent and of different sizes, the probability that RefPicList0 will be longer than RefPicList1 is greater than the probability that RefPicList1 is longer than RefPicList0. In other words, when RefPicList0 and RefPicList1 are substantially equivalent and of different sizes, the probability that the number of entries in RefPicList0 is greater than the number of entries in RefPicList1 is greater than the probability that the number of entries in RefPicList1 is greater than the number of entries in RefPicList0.

Accordingly, in some examples, video encoder 20 may signal the weighted prediction parameters only for one of the lists only when the sizes of RefPicList0 and RefPicList1 are the same, or when the size of RefPicList0 is longer than the size of RefPicList1, and not when the size of RefPicList1 is longer than the size of RefPicList0. This way, video decoder 30 may not need to determine for which reference picture list video decoder 30 received the weighted prediction parameters because the weighted prediction parameters, when RefPicList0 and RefPicList1 are substantially equivalent, will always be for RefPicList0.

FIGS. 2A and 2B are conceptual diagrams illustrating examples of substantially equivalent reference picture lists. FIG. 2A illustrates a first reference picture list (RefPicList0) and a second reference picture list (RefPicList1) that video decoder 30 constructed. For example, the index column of RefPicList0 and RefPicList1 indicates the index into RefPicList0 and RefPicList1, and the POC value column indicates the POC values of the reference pictures identified in RefPicList0 and RefPicList1.

To construct RefPicList0 and RefPicList1, video encoder 20 signaled, in the coded bitstream, and video decoder 30 received, from the coded bitstream, the syntax elements: num_ref_idx_l0_active_minus_1 and num_ref_idx_l1_active_minus1. The num_ref_idx_l0_active_minus1 syntax element indicates the number for entries in RefPicList0, and the num_ref_idx_l1_active_minus1 syntax element indicates the number of entries in RefPicList1. For example, num_ref_idx_l0_active_minus1 plus 1 equals the number of entries in RefPicList0, and num_ref_idx_l1_active_minus1 plus 1 equals the number of entries in RefPicList1. In the example of FIG. 2A, num_ref_idx_l0_active_minus1 equals 3, and num_ref_idx_l1_active_minus1 equals 3.

As illustrated in FIG. 2A, RefPicList0 and RefPicList1 are identical (which is one example of RefPicList0 and RefPicList1 being substantially equivalent). For example, RefPicList0 and RefPicList1 identify the same reference pictures (e.g., by their POC values), and in the same order. In this example, video encoder 20 may signal, in the coded bitstream, and video decoder 30 may receive, from the coded bitstream, the weighted prediction parameters for one of RefPicList0 or RefPicList1, and not for the other (e.g., receive weighted prediction parameters for only one the two reference picture lists). Video decoder 30 may determine the weighted prediction parameters for the other reference picture list based on the signaled weighted prediction parameters, and in some examples, only based on the signaled weighted prediction parameters.

FIG. 2B illustrates another example of RefPicList0 and RefPicList1. However, in this example, num_ref_idx_l0_active_minus1 equals 4 because there are a total of 5 entries in RefPicList0, and num_ref_idx_l1_active_minus1 equals 1 because there are a total of 2 entries in RefPicList1. Also, a subset of RefPicList0 is identical to the entirety or subset of RefPicList1 (which is another example of RefPicList0 and RefPicList1 being substantially equivalent). For example, the first 2 of 5 entries (i.e., a subset) of RefPicList0 are identical to both entries (i.e., the entirety) of RefPicList1.

In this example, video encoder 20 may signal the weighted prediction parameters of RefPicList0, and not signal the weighted prediction parameters of RefPicList1. Video decoder 30 may receive the weighted prediction parameters of RefPicList0, and may determine the weighted prediction parameters of RefPicList1 based on the received weighted prediction parameters of RefPicList0, and in some examples, only based on the received weighted prediction parameters of RefPicList0.

For instance, in this example, video decoder 30 may have determined the sizes of RefPicList0 and RefPicList1 (e.g., based on the values of num_ref_idx_l0_active_minus1 and num_ref_idx_l1_active_minus1). Video decoder 30 may receive 5 weighted prediction parameters from the coded bitstream. Video decoder 30 may determine that the 5 weighted prediction parameters are for RefPicList0 because the number of entries (i.e., size) of RefPicList0 is 5. Because video decoder 30 did not receive any more weighted prediction parameters, video decoder 30 may determine that the weighted prediction parameters for RefPicList1 are to be determined from the weighted prediction parameters for RefPicList0. For example, video decoder 30 may copy the first two weighted prediction parameters for RefPicList0 as the weighted prediction parameters for RefPicList1.

In the examples described above, video encoder 20 encodes and signals weighted prediction parameters for one of the two reference picture lists when the two reference picture lists are substantially equivalent, and not for the other reference picture list. Video decoder 30 receives and decodes weighted prediction parameters for one of the two reference picture lists when the two reference picture lists are substantially equivalent, and does not receive and decode weighted prediction parameters for the other one of the two reference picture lists. Rather, video decoder 30 determines the weighted prediction parameters for the reference picture list for which video decoder 30 did not receive the weighted prediction parameters from the weighted prediction parameters, and in some examples only from the weighted prediction parameters, for the reference picture for which video decoder 30 received the weighted prediction parameters.

However, the techniques described in this disclosure are not so limited. In some examples, the techniques may utilize the combined reference picture list (RefPicListC) for encoding and signaling or receiving and decoding weighted prediction parameters for RefPicList0 and RefPicList1. As described above, video encoder 20 and video decoder 30 each construct RefPicList0 and RefPicList1. The term P-slices refer to uni-directionally predicted slices, and are predicted from reference pictures in RefPicList0. The term B-slices refer to slices that uni-directionally predicted from reference pictures in RefPicList0 or RefPicList1, or bi-predicted from reference pictures from RefPicList0 and RefPicList1. In some cases, for uni-directionally predicted B-slices, video encoder 20 may need to specify whether the slice is being predicted from RefPicList0 or RefPicList1.

In some cases, to avoid signaling that indicates whether RefPicList0 or RefPicList1 is utilized for a uni-directionally predicted slice, video encoder 20 and video decoder 30 construct the combined reference picture list (RefPicListC) from RefPicList0 and RefPicList1. In general, the RefPicListC is utilized for uni-directionally predicted B-slices, but can also be used for P-slices. In these cases, video encoder 20 signals an index into RefPicListC, and video decoder 30 identifies a reference picture that is to be used for inter-predicting the uni-directionally predicted slice from the index into RefPicListC. In this way, video encoder 20 may not need to signal and video decoder 30 may not need to receive syntax elements that indicate whether the uni-directionally predicted slice is predicted from RefPicList0 or RefPicList1.

There may be various ways in which video encoder 20 and video decoder 30 construct RefPicListC. As one example, video encoder 20 and video decoder 30 may implement a default construction scheme for constructing RefPicListC from constructed RefPicList0 and RefPicList1. In other words, video encoder 20 and video decoder 30 may each construct RefPicList0 and RefPicList1 for the picture that includes the block to be inter-predicted. Then, video encoder 20 and video decoder 30 may each construct RefPicListC without video encoder 20 signaling and video decoder 30 receiving syntax elements indicating the manner in which RefPicListC is to be constructed. As another example, video decoder 30 may construct RefPicListC, and may then receive syntax elements indicating the manner in which RefPicListC is to be modified. As yet another example, video decoder 30 may receive syntax elements that indicate the manner in which video decoder 30 is to construct RefPicListC.

In these examples, when video encoder 20 and video decoder 30 construct RefPicListC, in some examples, video encoder 20 may signal the weighted prediction parameters for RefPicListC when RefPicList0 and RefPicList1 are substantially equivalent. In these examples, video encoder 20 may not signal the weighted prediction parameters for RefPicList0 and RefPicList1. Video decoder 30 may then determine the weighted prediction parameters for RefPicList0 and RefPicList1 from weighted prediction parameters for RefPicListC, without receiving the weighted prediction parameters for either RefPicList0 or RefPicList1.

For example, if RefPicList0 and RefPicList1 are identical, then RefPicListC will be identical to RefPicList0 and RefPicList1. In this case, video encoder 20 may signal the weighted prediction parameters for RefPicListC, and not for RefPicList0 and RefPicList1, and video decoder 30 may determine the weighted prediction parameters for RefPicList0 and RefPicList1 based on the weighted prediction parameters for RefPicListC.

As another example, if a subset of RefPicList0 is identical to the entirety or subset of RefPicList1 (or vice-versa), then RefPicListC may be identical to the longer of the two reference picture lists. In this case, video encoder 20 may signal the weighted prediction parameters for RefPicListC, and not for RefPicList0 and RefPicList1, and video decoder 30 may determine the weighted prediction parameters for RefPicList0 and RefPicList1 based on the weighted prediction parameters for RefPicListC. For example, video decoder 30 may have already determined the sizes of RefPicList0 and RefPicList1 based on num_ref_idx_l0_active_minus1 and num_ref_idx_l1_active_minus1, and may, therefore, have already determined which one of RefPicList0 or RefPicList1 is longer.

In this way, video decoder 30 may be able to determine whether the weighted prediction parameters for RefPicListC are the same as those for RefPicList0 or RefPicList1 based on the sizes of RefPicListC, RefPicList0, and RefPicList1. Then, video decoder 30 may determine the weighted prediction parameters for the other reference picture list (i.e., the shorter of RefPicList0 and RefPicList1).

As described above, in some examples, video encoder 20 may signal syntax elements that indicate the manner in which a constructed RefPicListC is to be modified or the manner in which RefPicListC is to be constructed. In these examples, video encoder 20 may signal syntax elements that indicate which reference pictures are to be included in RefPicListC. In addition, video encoder 20 may signal the size of RefPicListC with a syntax element (e.g., num_ref_idx_lc_active_minus1).

In these examples, video encoder 20 may not signal the weighted prediction parameters for RefPicListC. Rather, video decoder 30 may determine the weighted prediction parameters for RefPicListC from the weighted prediction parameters that video encoder 20 signaled for RefPicList0 and RefPicList1. In other words, even if RefPicList0 and RefPicList1 are not substantially equivalent, video encoder 20 may not need to signal the weighted prediction parameters for RefPicListC, and video decoder 30 may instead determine the weighted prediction parameters for RefPicListC from the signaled weighted prediction parameters for RefPicList0 and RefPicList1.

In the above examples, it was assumed that when two reference picture lists are substantially equivalent that the weighted prediction parameters are the same, which allows one reference picture list to inherit the weighted prediction parameters for the other reference picture list. However, this need not always be the case. It may be possible that even when two reference picture lists are substantially equivalent that the weighted prediction parameters for the reference pictures in each of the lists is different. In such cases, video encoder 20 may signal and video decoder 30 may receive weighted prediction parameters for both reference picture lists, even if both reference picture lists are substantially equivalent. However, for purposes of illustration, the techniques described in this disclosure are described with examples where the weighted prediction parameters for substantially equivalent reference picture lists are the same.

Accordingly, in the example techniques described in this disclosure, a video coder (which is a generic term for video encoder 20 or video decoder 30) may code (which is a generic term for encode or decode) weighted prediction parameters for a first list of a current picture. The video coder may determine the weighted prediction parameters for a second list of the current picture based on the coded weighted prediction parameters for the first list. In some example, the video coder may determine the weighted prediction parameters for the second list based only on the coded weighted prediction parameters for the first list. The video coder may then inter-predict a block (e.g., inter-prediction encode or inter-prediction decode the block) within the current picture based on the at least on one or more of the coded weighted prediction parameters and the determined weighted prediction parameters.

In these examples, the first list may be a first reference picture list (RefPicList0), a second reference picture list (RefPicList1), or a combined reference picture list (RefPicListC), and the second list is different than the first list. In any event, the first list and the second list include reference pictures used for inter-predicting one or more blocks within the current picture. In examples where the video coder determines the weighted prediction parameters for the second list based on the weighted prediction parameters of the first list, the video coder may determine the weighted prediction parameters for the second list based only on the weighted prediction parameters for the first list, and without coding the weighted prediction parameters for the second list.

In some examples, the video coder may determine the weighted prediction parameters for the second list based on the weighted prediction parameters for the first list when the first list and a third list are substantially equivalent. For example, assume that the first list is RefPicList0, the second list is RefPicListC, and the third list is RefPicList1. In this example, the video coder may determine the weighted prediction parameters for RefPicListC based on the weighted prediction parameters for RefPicList0 when RefPicList0 and RefPicList1 are substantially equivalent.

As another example, assume that the first list is RefPicList0 and the second list is RefPicList1. In this example, the third list is equal to the second list (i.e., the third list is also RefPicList1). In this example, if the first list and the third list (i.e., RefPicList0 and RefPicList1) are substantially equivalent, then the video coder may determine the weighted prediction parameters for the second list (i.e., RefPicList1) based on the weighted prediction parameters for the first list (i.e., RefPicList0).

The various aspects for determining the weighted prediction parameters for one list from another list are described below with corresponding syntax element. Some aspects utilize the definition of ref_pic_list_combination_flag, as defined above, and in HEVC WD6, such as aspects where RefPicList0 and RefPicList1 are identical. Some aspects modify the definition of ref_pic_list_combination_flag, such as aspects where a subset of RefPicList0 or RefPicList1 is identical to the entirety or subset of the other (e.g., N entries in RefPicList0 are identical to N entries in RefPicList1, where the N entries in RefPicList1 may be the entirety of RefPicList1). Again, the ref_pic_list_combination_flag is one example of a syntax element that can be used to indicate whether reference picture lists are substantially equivalent. However, the techniques are not limited to using ref_pic_list_combination_flag. Moreover, the techniques described in this disclosure are extendable to situations where combined reference picture lists are not contemplated or used.

In a first aspect, the definition of ref_pic_list_combination_flag is the same as defined above with respect to Table 1. In this first aspect, if it is assumed that when two lists are "identical" that the weighted prediction parameters for one of the lists (e.g., RefPicList1) are inherited from the other (e.g., RefPicList0), then Table 3 provides examples of the syntax elements. If, however, the value of ref_pic_list_combination_flag does not indicate whether the weighted prediction parameters are the same for both lists, then video encoder 20 signals weighted prediction parameters for both RefPicList0 and RefPicList1 even if RefPicList0 and RefPicList1 are substantially equivalent.

As indicated in Table 3 below, the pseudo code of "if (slice_type==B)" in Table 1 is replaced with "if (slice_type==B && ref_pic_list_combination_flag!=0)." In other words, the pseudo code indicates that only when RefPicList0 and RefPicList1 are not identical are the instances when video encoder 20 signals the weighted prediction parameters for RefPicList1.

TABLE 3

PREDICTION WEIGHT TABLE SYNTAX

| pred_weight_table( ) { | Descriptor |
|---|---|
|     luma_log2_weight_denom | ue(v) |
|     if( chroma_format_idc != 0 ) | |
|         delta_chroma_log2_weight_denom | se(v) |
|     if( slice_type == P \|\| | |
|       ( slice_type == B && ref_pic_list_modification_flag_lc == 0 ) ) { | |
|         for( i = 0; i <= num_ref_idx_l0_active_minus1; i++ ) { | |
|             luma_weight_l0_flag | u(1) |
|             if( luma_weight_l0_flag ) { | |
|                 delta_luma_weight_l0[ i ] | se(v) |
|                 luma_offset_l0[ i ] | se(v) |
|             } | |
|             if( chroma_format_idc != 0 ) { | |
|                 chroma_weight_l0_flag | u(1) |
|                 if( chroma_weight_l0_flag ) | |
|                   for( j =0; j < 2; j++ ) { | |
|                       delta_chroma_weight_l0[ i ][ j ] | se(v) |
|                       delta_chroma_offset_l0[ i ][ j ] | se(v) |
|                 } | |
|             } | |
|         } | |
|     } | |
|     if( slice_type == B && ref_pic_list_combination_flag ! = 0 ) { | |
|         for( i = 0; i <= num_ref_idx_l1_active_minus1; i++ ) { | |

TABLE 3-continued

PREDICTION WEIGHT TABLE SYNTAX

| pred_weight_table( ) { | Descriptor |
|---|---|
|         luma_weight_l1_flag | u(1) |
|         if( luma_weight_l1_flag ) { | |
|             delta_luma_weight_l1[ i ] | se(v) |
|             luma_offset_l1[ i ] | se(v) |
|         } | |
|         if( chroma_format_idc != 0 ) { | |
|             chroma_weight_l1_flag | u(1) |
|             if( chroma_weight_l1_flag ) | |
|                 for( j = 0; j < 2; j++ ) { | |
|                     delta_chroma_weight_l1[ i ][ j ] | se(v) |
|                     delta_chroma_offset_l1[ i ][ j ] | se(v) |
|                 } | |
|             } | |
|         } | |
|     } | |
|     if( slice_type = = B && ref_pic_list_modification_flag_lc != 0 ) { | |
|         for( i = 0; i <= num_ref_idx_lc_active_minus1; i++ ) { | |
|             luma_weight_lc_flag | u(1) |
|             if( luma_weight_l1_flag ) { | |
|                 delta_luma_weight_lc[ i ] | se(v) |
|                 luma_offset_lc[ i ] | se(v) |
|             } | |
|             if( chroma_format_idc != 0 ) { | |
|                 chroma_weight_lc_flag | u(1) |
|                 if( chroma_weight_lc_flag ) | |
|                     for( j = 0; j < 2; j++ ) { | |
|                         delta_chroma_weight_lc[ i ][ j ] | se(v) |
|                       delta_chroma_offset_lc[ i ][ j ] | se(v) |
|                 } | |
|             } | |
|         } | |
|     } | |
| } | |

In Table 3, for P-slices and B-slices without the list combination operation (e.g., ref_pic_list_modification_flag_lc==0), video encoder 20 signals weighted prediction parameters for RefPicList0. The ref_pic_list_modification_flag_lc syntax element indicates whether any modification on the combined reference picture list is needed, and when 0 indicates that no modification of the combined reference picture list is needed.

In this example, if RefPicList0 and RefPicList1 are not identical, then video encoder 20 signals the weighted prediction parameters for RefPicList1 for B-slices and when ref_pic_list_modification_flag_lc equals 0. Otherwise, video encoder 20 does not signal the weighted prediction parameters for RefPicList1 because the weighted prediction parameters for RefPicList0 and RefPicList1 are the same.

If combined reference picture list modification is present (i.e., ref_pic_list_modification_flag_lc==1), then video encoder 20 signals the weighted prediction parameters for RefPicListC. Video decoder 30 may determine the weighted prediction parameters for RefPicList0 and RefPicList1 from the signaled weighted prediction parameters for RefPicListC. For example, to construct RefPicListC, video decoder 30 may have selected reference pictures from RefPicList0 and RefPicList1. In this way, video decoder 30 may have determined the mapping between RefPicList0 and RefPicList1 and RefPicListC (i.e., may have determined which pictures from RefPicList0 and RefPicList1 are included in RefPicListC and in which index of RefPicListC).

Accordingly, by receiving the weighted prediction parameters for RefPicListC, and by having previously determined the mapping between the RefPicListC and RefPicList0 and RefPicList1, video decoder 30 may determine the weighted prediction parameters for RefPicList0 and RefPicList1. For example, assume that video decoder 30 included the first reference picture of RefPicList0 as the first reference picture of RefPicListC, and included the first reference picture of RefPicList1 as the second reference picture of RefPicListC. In this example, video decoder 30 may receive the weighted prediction parameters for the first two reference pictures of RefPicListC. Video decoder 30 may set the first weighted prediction parameter of RefPicListC as the weighted prediction parameter for the first picture of RefPicList0, and may set the second weighted prediction parameter of RefPicListC as the weighted prediction parameter for the second picture of RefPicList1.

In a second aspect, the definition of ref_pic_list_combination_flag may be different than that defined above and in HEVC WD6. For example, in the second aspect, ref_pic_list_combination_flag equal to 1 may indicate that RefPicList0 and RefPicList1 are combined to an additional reference picture list combination (e.g., RefPicListC) used for the prediction units being uni-directionally predicted. The ref_pic_list_combination_flag equal to 0 may indicate that first N=min (num_ref_idx_l0_active_minus1+1, num_ref_idx_l1_active_minus1+1) of the shorter list (RefPicList0 or RefPicList1) is equal to the first (e.g., top) N elements (e.g., entries) of the longer list (i.e., a subset of one list is identical to the entirety or subset of another list). In this example, the longer list is used as the RefPicListC, and RefPicListC is set to be empty at the start of the loop defined in the below Table 4. In other words, if the first N elements (e.g., entries) of the shorter list is equivalent to the first N elements of the longer list, video encoder 20 may signal the weighted prediction parameters for only the N elements. In some examples, if there are additional reference pictures in each, video encoder 20 may signal the weighted prediction parameters for the remaining pictures.

TABLE 4

PREDICTION WEIGHT TABLE SYNTAX

| pred_weight_table( ) { | Descriptor |
|---|---|
|     luma_log2_weight_denom | ue(v) |
|     if( chroma_format_idc != 0 ) | |
|         delta_chroma_log2_weight_denom | se(v) |
|     if( slice_type == P \|\| | |
|       ( slice_type == B && ref_pic_list_combination_flag != 0 && | |
|         ref_pic_list_modification_flag_lc == 0 ) ) { | |
|       for( i = 0; i <= num_ref_idx_l0_active_minus1; i++ ) { | |
|         luma_weight_l0_flag | u(1) |
|         if( luma_weight_l0_flag ) { | |
|           delta_luma_weight_l0[ i ] | se(v) |
|           luma_offset_l0[ i ] | se(v) |
|         } | |
|         if( chroma_format_idc != 0 ) { | |
|           chroma_weight_l0_flag | u(1) |
|           if( chroma_weight_l0_flag ) | |
|             for( j =0; j < 2; j++ ) { | |
|               delta_chroma_weight_l0[ i ][ j ] | se(v) |
|               delta_chroma_offset_l0[ i ][ j ] | se(v) |
|             } | |
|         } | |
|       } | |
|     } | |
|     if( slice_type == B ) { | |
|       for( i = 0; i <= num_ref_idx_l1_active_minus1; i++ ) { | |
|         luma_weight_l1_flag | u(1) |
|         if( luma_weight_l1_flag ) { | |
|           delta_luma_weight_l1[ i ] | se(v) |
|           luma_offset_l1[ i ] | se(v) |
|         } | |
|         if( chroma_format_idc != 0 ) { | |
|           chroma_weight_l1_flag | u(1) |
|           if( chroma_weight_l1_flag ) | |
|             for( j = 0; j < 2; j++ ) { | |
|               delta_chroma_weight_l1[ i ][ j ] | se(v) |
|               delta_chroma_offset_l1[ i ][ j ] | se(v) |
|             } | |
|         } | |
|       } | |
|     } | |
|     if( slice_type == B && (ref_pic_list_combination_flag == 0 \|\| | |
|       ref_pic_list_modification_flag_lc != 0 ) { | |
|       numRefIdx_minus1 = ( ref_pic_list_modification_flag_lc ? | |
|           num_ref_idx_lc_active_minus1 : | |
|           Max( num_ref_idx_l0_active_minus1, | |
|             num_ref_idx_l1_active_minus1 ) | |
|       for( i = 0; i <= numRefIdx_minus1; i++ ) { | |
|         luma_weight_lc_flag | u(1) |
|         if( luma_weight_l1_flag ) { | |
|           delta_luma_weight_lc[ i ] | se(v) |
|           luma_offset_lc[ i ] | se(v) |
|         } | |
|         if( chroma_format_idc != 0 ) { | |
|           chroma_weight_lc_flag | u(1) |
|           if( chroma_weight_lc_flag ) | |
|             for( j = 0; j < 2; j++ ) { | |
|               delta_chroma_weight_lc[ i ][ j ] | se(v) |
|               delta_chroma_offset_lc[ i ][ j ] | se(v) |
|             } | |
|         } | |
|       } | |
|     } | |
| } | |

In the second aspect, if the P-slices and B-slices are not identical (and ref_pic_list_combination_flag!=0) and there are not list combination operations (i.e., ref_pic_list_modification_flag_lc==0), video encoder 20 may signal the weighted prediction parameters for RefPicList0 and RefPicList1. If list modification is present (i.e., ref_pic_list_modification_flag!=0) or RefPicList0 and RefPicList1 are substantially equivalent (i.e., ref_pic_list_combination_flag==0), then video encoder 20 may signal the weighted prediction parameters for RefPicListC. Video decoder 30 may determine the weighted prediction parameters for RefPicList0 and RefPicList1 from the signaled weighted prediction parameters for RefPicListC.

For the case when RefPicList0 and RefPicList1 are substantially equivalent (i.e., ref_pic_list_combination_flag==0), video decoder 30 may determine for which reference picture list video decoder 30 received the weighted prediction parameters based on the sizes of each (i.e., based on num_ref_idx_l0_active_minus1, num_ref_idx_l1_active_minus1). Video decoder 30 may determine the weighted prediction parameters for the list for which video decoder 30 did not receive the weighted prediction parameters by copying the weighted prediction parameters for the signaled list to the not signaled list, and truncating after the first N elements (i.e., as determined by the size of the not signaled list).

For the case where RefPicListC is to be modified, video decoder 30 may determine the origin of pictures in RefPicListC from RefPicList0 based on the syntax elements of reference picture list combination syntax described above with Table 2. Also, if weighted prediction parameters for both RefPicList0 and RefPicList1 are to be signaled even if the two lists are substantially equivalent, video encoder 20 may signal and video decoder 30 may receive the weighted prediction parameters for both lists.

It should be understood that the syntax element "ref_pic_list_combination_flag" could be replaced by any syntax element name in the above examples to indicate whether or not two lists are substantially equivalent. If the 0 value of the syntax element indicates that the lists are substantially equivalent, then the above syntax elements may be the same. Otherwise, the logic checking the value of such a syntax element should be reversed (i.e., ==0 would be replaced with !=0, and vice-versa).

Similarly, the syntax element "ref_pic_list_modification_flag_lc" could be replaced by any syntax element name in the above examples that indicates whether or not video decoder 30 is to construct RefPicListC by explicit signaling from video encoder 20. If the value of such a syntax element is 0, video decoder 30 may construct RefPicListC using non-explicitly signaled techniques (e.g., default or implicit techniques). If the 0 value of the syntax element indicates that RefPicListC is not explicitly constructed, then the above syntax may be the same. Otherwise, the logic for checking the value of this syntax element should be reversed (i.e., ==0 would be replaced by !=0, and vice-versa).

In a third aspect, it is assumed that default RefPicListC formation does not consider the weighted prediction parameters in list construction. Also, video encoder 20 always signals the weighted prediction parameters for B-slices in the RefPicListC instead of signaling them separately for RefPicList0 and RefPicList1. P-slices use a single list, so the techniques of P-slices in this third aspect are the same as above. P-slices may be treated as a special case of RefPicListC where all of the referenced pictures come from one list (i.e., RefPicList0). In this third aspect, combined list signaling holds for the default combined list process or modified combined list where video encoder 20 explicitly signals the combined list entries.

In this third aspect, the ref_pic_list_combination_flag may not affect the signaling of the weighted prediction parameters since if both RefPicList0 and RefPicList1 are substantially equivalent, RefPicListC would be equivalent to one of RefPicList0 or RefPicList1. The value of num_ref_idx_lc_active_minus1 is equal to what video encoder 20 signaled in the slice header, if present. For default or implicit construction of RefPicListC, the value of num_ref_idx_lc_active_minus1 is not signaled, and is assumed to equal the size minus 1 of RefPicListC generated from the implicit or default technique for constructing RefPicListC. One example default technique for constructing RefPicListC is provided in section 8.3.4.3 Mapping process for reference picture lists combination in B slices in HEVC WD6. However, the techniques are not limited to such default techniques for constructing RefPicListC.

TABLE 5

PREDICTION WEIGHT TABLE SYNTAX

| pred_weight_table( ) { | Descriptor |
|---|---|
|     luma_log2_weight_denom | ue(v) |
|     if( chroma_format_idc != 0 ) | |
|         delta_chroma_log2_weight_denom | se(v) |
|     if( slice_type == P ) { | |
|         for( i = 0; i <= num_ref_idx_l0_active_minus1; i++ ) { | |
|             luma_weight_l0_flag | u(1) |
|             if( luma_weight_l0_flag ) { | |
|                 delta_luma_weight_l0[ i ] | se(v) |
|                 luma_offset_l0[ i ] | se(v) |
|             } | |
|             if( chroma_format_idc != 0 ) { | |
|                 chroma_weight_l0_flag | u(1) |
|                 if( chroma_weight_l0_flag ) | |
|                     for( j =0; j < 2; j++ ) { | |
|                         delta_chroma_weight_l0[ i ][ j ] | se(v) |
|                         delta_chroma_offset_l0[ i ][ j ] | se(v) |
|                     } | |
|             } | |
|         } | |
|     } | |
|     if( slice_type == B ) { | |
|         for( i = 0; i <= num_ref_idx_lc_active_minus1; i++ ) { | |
|             luma_weight_lc_flag | u(1) |
|             if( luma_weight_l1_flag ) { | |
|                 delta_luma_weight_lc[ i ] | se(v) |
|                 luma_offset_lc[ i ] | se(v) |
|             } | |
|             if( chroma_format_idc != 0 ) { | |
|                 chroma_weight_lc_flag | u(1) |
|                 if( chroma_weight_lc flag ) | |
|                     for( j = 0; j < 2; j++ ) { | |
|                         delta_chroma_weight_lc[ i ][ j ] | se(v) |
|                         delta_chroma_offset_lc[ i ][ j ] | se(v) |
|                     } | |
|             } | |

TABLE 5-continued

PREDICTION WEIGHT TABLE SYNTAX

| pred_weight_table( ) { | Descriptor |
|---|---|
|         } | |
|     } | |
| } | |

Alternatively, in the third aspect, if P-slices are treated as a special case of combined list with num_ref_idx_l0_active_minus1 plus 1 entries, then the syntax for B-slices and P-slices can be combined. For P-slices, the value of num_ref_idx_lc_active_minus1 would be equal to num_ref_idx_l0_active_minus1, for default RefPicListC for B-slices, its value would be equal to the size of the list that is resulting from the process described in section 8.3.4.3 (noted above), and one example. For the case when the reference pictures for RefPicListC are signaled explicitly using the ref_pic_list_modification_flag_lc, then its value would be equal to num_ref_idx_lc_active_minus1 syntax. Table 6 provides the syntax elements for the alternative to the third aspect.

TABLE 6

PREDICTION WEIGHT TABLE SYNTAX

| pred_weight_table( ) { | Descriptor |
|---|---|
|   luma_log2_weight_denom | ue(v) |
|   if( chroma_format_idc != 0 ) | |
|     delta_chroma_log2_weight_denom | se(v) |
|     for( i = 0; i <= num_ref_idx_lc_active_minus1; i++ ) { | |
|       luma_weight_lc_flag | u(1) |
|       if( luma_weight_l1_flag ) { | |
|         delta_luma_weight_lc[ i ] | se(v) |
|         luma_offset_lc[ i ] | se(v) |
|       } | |
|       if( chroma_format_idc != 0 ) { | |
|         chroma_weight_lc flag | u(1) |
|         if( chroma_weight_lc_flag ) | |
|           for( j = 0; j < 2; j++ ) { | |
|             delta_chroma_weight_lc[ i ][ j ] | se(v) |
|             delta_chroma_offset_lc[ i ][ j ] | se(v) |
|           } | |
|       } | |
|     } | |
| } | |

In a fourth aspect, the definition of ref_pic_list_combination_flag is same as described above with respect to Table 1 and HEVC WD6. The fourth aspect may be similar to the first aspect, and Table 7 provides the syntax elements for the fourth aspect. However, in the fourth aspect, video encoder 20 may not signal the modified combined list weighted prediction parameters. In this example, video decoder 30 may determine the weighted prediction parameters for RefPicListC from the weighted prediction parameters of RefPicList0 and RefPicList1.

TABLE 7

PREDICTION WEIGHT TABLE SYNTAX

| pred_weight_table( ) { | Descriptor |
|---|---|
|   luma_log2_weight_denom | ue(v) |
|   if( chroma_format_idc != 0 ) | |
|     delta_chroma_log2_weight_denom | se(v) |
|   if( slice_type == P || slice_type == B) { | |
|     for( i = 0; i <= num_ref_idx_l0_active_minus1; i++ ) { | |
|       luma_weight_l0_flag | u(1) |
|       if( luma_weight_l0_flag ) { | |
|         delta luma_weight_l0[ i ] | se(v) |
|         luma_offset_l0[ i ] | se(v) |
|       } | |
|       if( chroma_format_idc != 0 ) { | |
|         chroma_weight_l0_flag | u(1) |
|         if( chroma_weight_l0_flag ) | |

TABLE 7-continued

PREDICTION WEIGHT TABLE SYNTAX

| pred_weight_table( ) { | Descriptor |
|---|---|
|         for( j =0; j < 2; j++ ) { | |
|             delta_chroma_weight_l0[ i ][ j ] | se(v) |
|             delta_chroma_offset_l0[ i ][ j ] | se(v) |
|         } | |
|     } | |
|   } | |
|   if( slice_type = = B && ref_pic_list_combination_flag != 0 ) { | |
|     for( i = 0; i <= num_ref_idx_l1_active_minus1; i++ ) { | |
|       luma_weight_l1_flag | u(1) |
|       if( luma_weight_l1_flag ) { | |
|         delta_luma_weight_l1[ i ] | se(v) |
|         luma_offset_l1[ i ] | se(v) |
|       } | |
|       if( chroma_format_idc != 0 ) { | |
|         chroma_weight_l1_flag | u(1) |
|         if( chroma_weight_l1_flag ) | |
|           for( j = 0; j < 2; j++ ) { | |
|             delta_chroma_weight_l1[ i ][ j ] | se(v) |
|             delta_chroma_offset_l1[ i ][ j ] | se(v) |
|           } | |
|         } | |
|       } | |
|     } | |
|   } | |
| } | |

Figure 3:
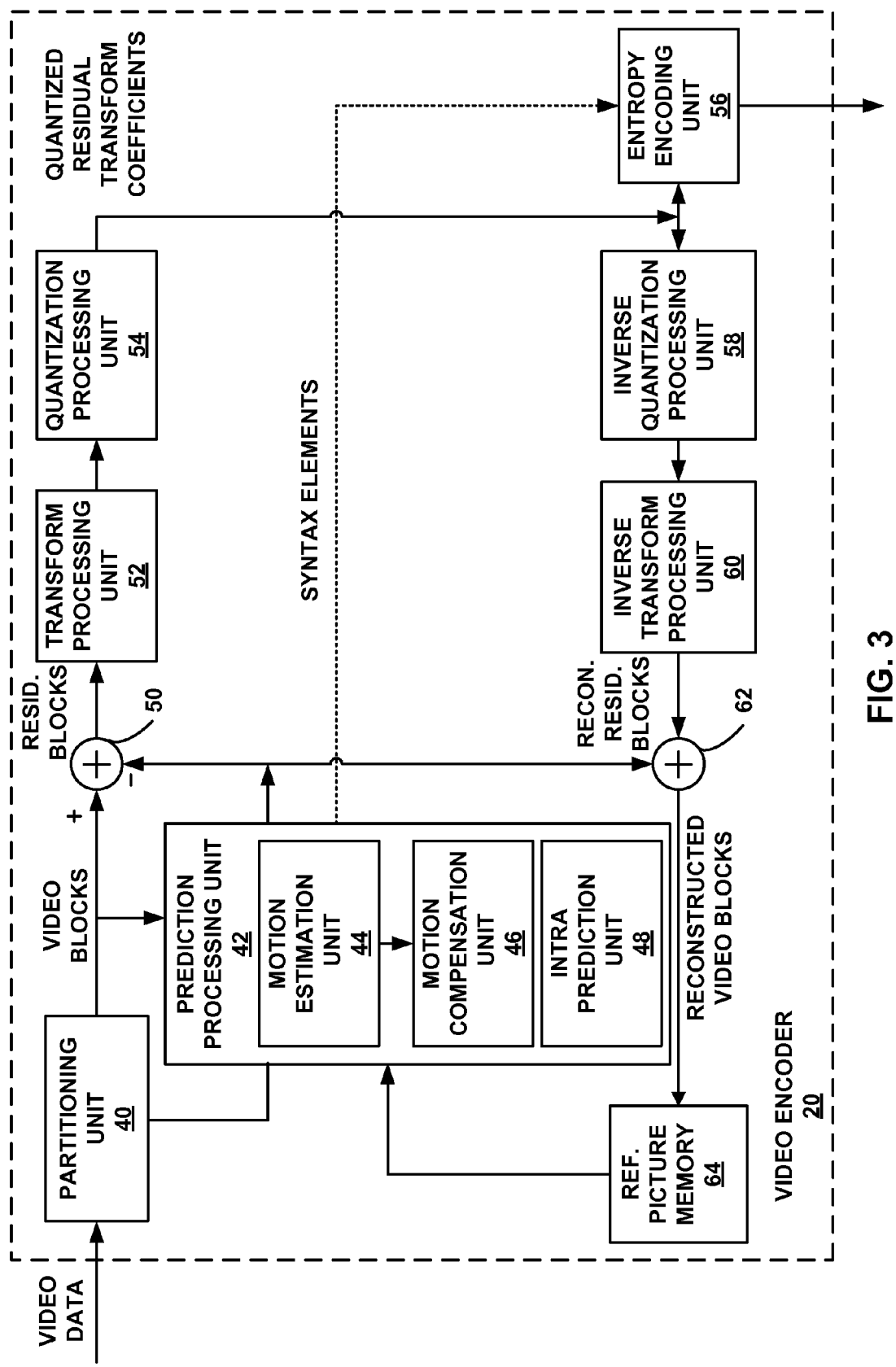
FIG. 3 is a block diagram illustrating an example of a video encoder that may implement the techniques described in this disclosure.

FIG. 3 is a block diagram illustrating an example of a video encoder that may implement the techniques described in this disclosure. For example, FIG. 3 illustrates video encoder 20 which may perform intra- and inter-coding (e.g., intra-predicting such as intra-prediction encoding or inter-predicting such as inter-prediction encoding) of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 40, prediction processing unit 42, reference picture memory 64, summer 50, transform processing unit 52, quantization processing unit 54, and entropy encoding unit 56. Prediction processing unit 42 includes motion estimation unit 44, motion compensation unit 46, and intra prediction unit 48. For video block reconstruction, video encoder 20 also includes inverse quantization processing unit 58, inverse transform processing unit 60, and summer 62. A deblocking filter (not shown in FIG. 3) may also be included to filter block boundaries to remove blockiness artifacts from reconstructed video. If desired, the deblocking filter would typically filter the output of summer 62. Additional loop filters (in loop or post loop) may also be used in addition to the deblocking filter. Reference picture memory 64 is one example of a decoding picture buffer (DPB).

As shown in FIG. 3, video encoder 20 receives video data, and partitioning unit 40 partitions the data into video blocks. This partitioning may also include partitioning into slices, tiles, or other larger units, as wells as video block partitioning (e.g., according to a quadtree structure of LCUs and CUs). Video encoder 20 generally illustrates the components that encode video blocks within a video slice to be encoded. The slice may be divided into multiple video blocks (and possibly into sets of video blocks referred to as tiles). Prediction processing unit 42 may select one of a plurality of possible coding modes, such as one of a plurality of intra coding modes or one of a plurality of inter coding modes, for the current video block based on error results (e.g., coding rate and the level of distortion). Prediction processing unit 42 may provide the resulting intra- or inter-coded block to summer 50 to generate residual block data and to summer 62 to reconstruct the encoded block for use as a reference picture.

Intra prediction unit 48 within prediction processing unit 42 may perform intra-predictive coding of the current video block relative to one or more neighboring blocks in the same frame or slice as the current block to be coded to provide spatial compression. Motion estimation unit 44 and motion compensation unit 46 within prediction processing unit 42 perform inter-predictive coding of the current video block relative to one or more predictive blocks in one or more reference pictures to provide temporal compression.

Motion estimation unit 44 may be configured to determine the inter-prediction mode for a video slice according to a predetermined pattern for a video sequence. The predetermined pattern may designate video slices in the sequence as P slices or B slices. Motion estimation unit 44 and motion compensation unit 46 may be highly integrated, but are illustrated separately for conceptual purposes. Motion estimation, performed by motion estimation unit 44, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 44 may perform a motion search relative to the full pixel positions and fractional pixel positions and output a motion vector with fractional pixel precision.

Motion estimation unit 44 calculates a motion vector for a PU of a video block in an inter-coded slice by comparing the position of the PU to the position of a predictive block of a reference picture. The reference picture may be selected from a first reference picture list (RefPicList0) or a second reference picture list (RefPicList1), each of which identify one or more reference pictures stored in reference picture memory 64. Motion estimation unit 44 sends the calculated motion vector to entropy encoding unit 56 and motion compensation unit 46.

Motion compensation, performed by motion compensation unit 46, may involve fetching or generating the predictive block based on the motion vector determined by motion estimation, possibly performing interpolations to sub-pixel precision. Upon receiving the motion vector for the PU of the current video block, motion compensation unit 46 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 46 may also generate syntax elements associated with the video blocks and the video slice for use by video decoder 30 in decoding the video blocks of the video slice.

Intra-prediction unit 48 may intra-predict a current block, as an alternative to the inter-prediction performed by motion estimation unit 44 and motion compensation unit 46, as described above. In particular, intra-prediction unit 48 may determine an intra-prediction mode to use to encode a current block. In some examples, intra-prediction unit 48 may encode a current block using various intra-prediction modes, e.g., during separate encoding passes, and intra-prediction unit 48 (or a mode select unit, in some examples) may select an appropriate intra-prediction mode to use from the tested modes. For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 48 may calculate ratios from the distortions and rates for the various encoded blocks to determine which intra-prediction mode exhibits the best rate-distortion value for the block.

In any case, after selecting an intra-prediction mode for a block, intra-prediction unit 48 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 42 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization processing unit 58 and inverse transform processing unit 60 apply inverse quantization and inverse transformation, respectively, to reconstruct the residual block in the pixel domain for later use as a reference block of a reference picture. Motion compensation unit 46 may calculate a reference block by adding the residual block to a predictive block of one of the reference pictures within one of the reference picture lists. Motion compensation unit 46 may also apply one or more interpolation filters to the reconstructed residual block to calculate sub-integer pixel values for use in motion estimation. Summer 62 adds the reconstructed residual block to the motion compensated prediction block produced by motion compensation unit 46 to produce a reference block for storage in reference picture memory 64. The reference block may be used by motion estimation unit 44 and motion compensation unit 46 as a reference block to inter-predict a block in a subsequent video frame or picture.

In this manner, video encoder 20 is an example of a video encoder that is configured to implement one or more example techniques described in this disclosure. For example, prediction processing unit 42 may be configured to implement the example techniques for determining weighted prediction parameters for a list from another list. In some examples, a unit other than prediction processing unit 42 may implement the examples described above. In some examples, prediction processing unit 42 in conjunction with one or more other units of video encoder 20 may implement the examples described above. In some examples, a processor or unit of video encoder 20 (not shown in FIG. 3) may, alone or in conjunction with other units of video encoder 20, implement the examples described above.

Figure 4:
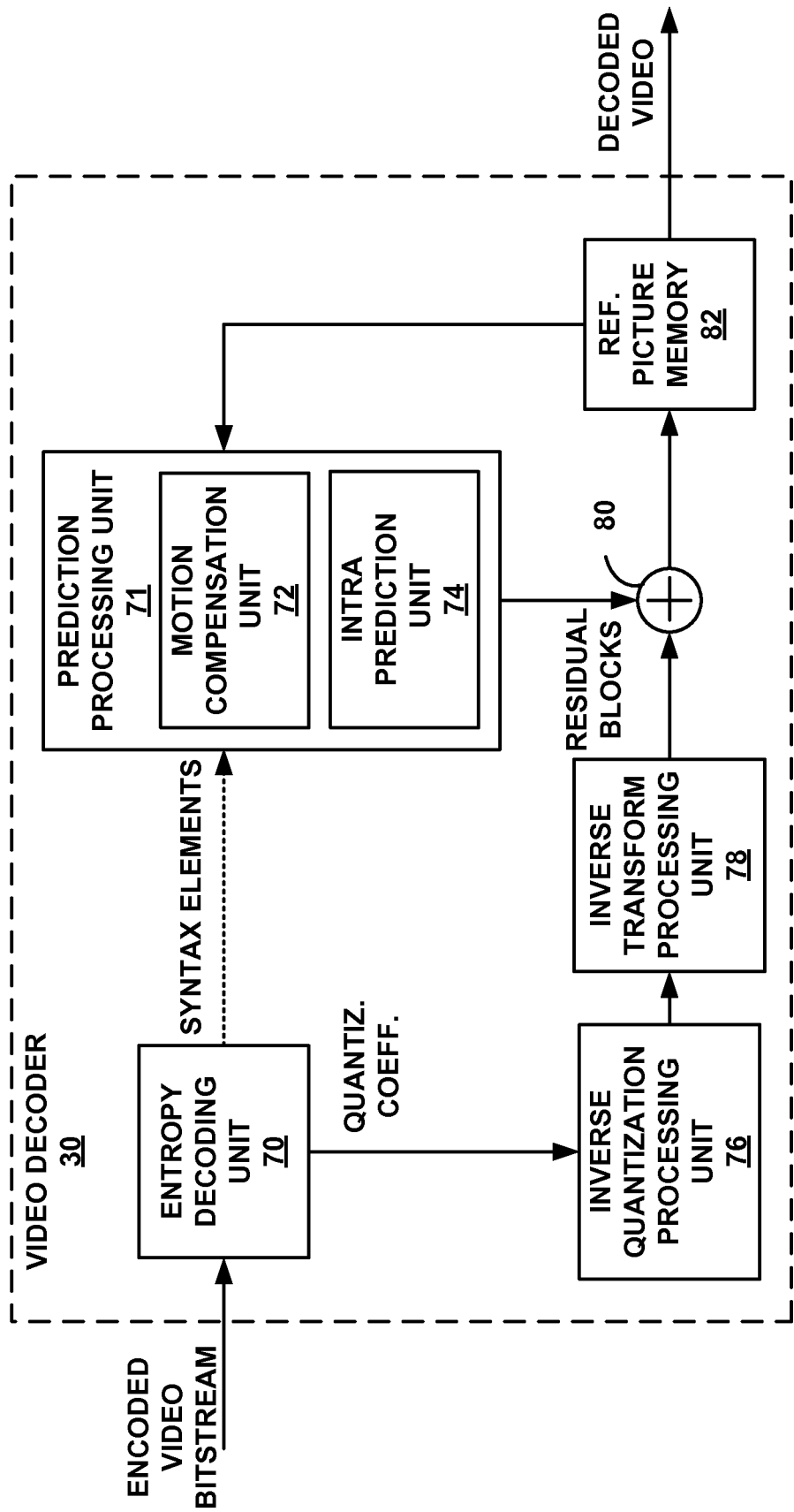
FIG. 4 is a block diagram illustrating an example of a video decoder that may implement the techniques described in this disclosure.

FIG. 4 is a block diagram illustrating an example of a video decoder that may implement the techniques described in this disclosure. For example, video decoder 30 may perform inter-prediction decoding or intra-prediction decoding. FIG. 4 illustrates video decoder 30. In the example of FIG. 4, video decoder 30 includes an entropy decoding unit 70, prediction processing unit 71, inverse quantization processing unit 76, inverse transform processing unit 78, summer 80, and reference picture memory 82. Prediction processing unit 71 includes motion compensation unit 72 and intra prediction unit 74. Video decoder 30 may, in some examples, perform a decoding pass generally reciprocal to the encoding pass described with respect to video encoder 20 from FIG. 3. Reference picture memory 82 is one example of a decoded picture buffer (DPB).

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to prediction processing unit 71. Video decoder 30 may receive the syntax elements at the video slice level and/or the video block level.

When the video slice is coded as an intra-coded (I) slice, intra prediction unit 74 of prediction processing unit 71 may generate prediction data for a video block of the current video slice based on a signaled intra prediction mode and data from previously decoded blocks of the current frame or picture. When the video frame is coded as an inter-coded (i.e., B or P) slice, motion compensation unit 72 of prediction processing unit 71 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists (RefPicList0 and RefPicList1) using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization processing unit 76 inverse quantizes (i.e., de-quantizes), the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform (e.g., an inverse DCT, an inverse integer transform, or a conceptually similar inverse transform process), to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video encoder 30 is an example of a video decoder that is configured to implement one or more example techniques described in this disclosure. For example, prediction processing unit 71 may be configured to implement the example techniques for determining weighted prediction parameters for a list from another list. In some examples, a unit other than prediction processing unit 71 may implement the examples described above. In some examples, prediction processing unit 71 in conjunction with one or more other units of video decoder 30 may implement the examples described above. In yet some other examples, a processor or unit of video decoder 30 (not shown in FIG. 4) may, alone or in conjunction with other units of video decoder 30, implement the examples described above.

Figure 5:
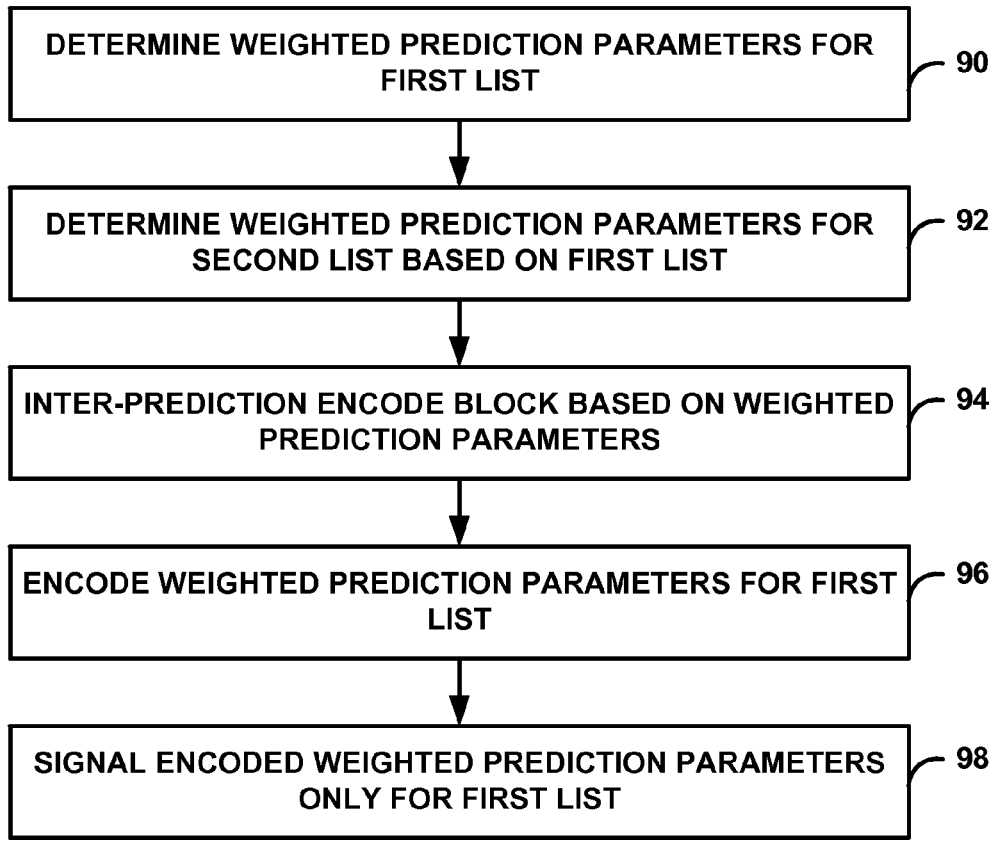
FIG. 5 is a flowchart illustrating exemplary operation of a video encoder in accordance with one or more examples described in this disclosure.

FIG. 5 is a flowchart illustrating an example operation of a video encoder in accordance with one or more techniques described in this disclosure. The techniques illustrated in FIG. 5 for a video encoder may be applicable to video encoder 20 or other types of video encoders.

The video encoder may determine weighted prediction parameters for a first list (90). The video encoder may determine weighted prediction parameters for a second list based only on the weighted prediction parameters of the first list (92). The video encoder may inter-prediction encode a block based on the weighted prediction parameters for the first and second lists (94). The video encoder may encode the weighted prediction parameters only for the first list (96). The video encoder may signal the encoded weighted prediction parameters only for the first list (98).

Figure 6:
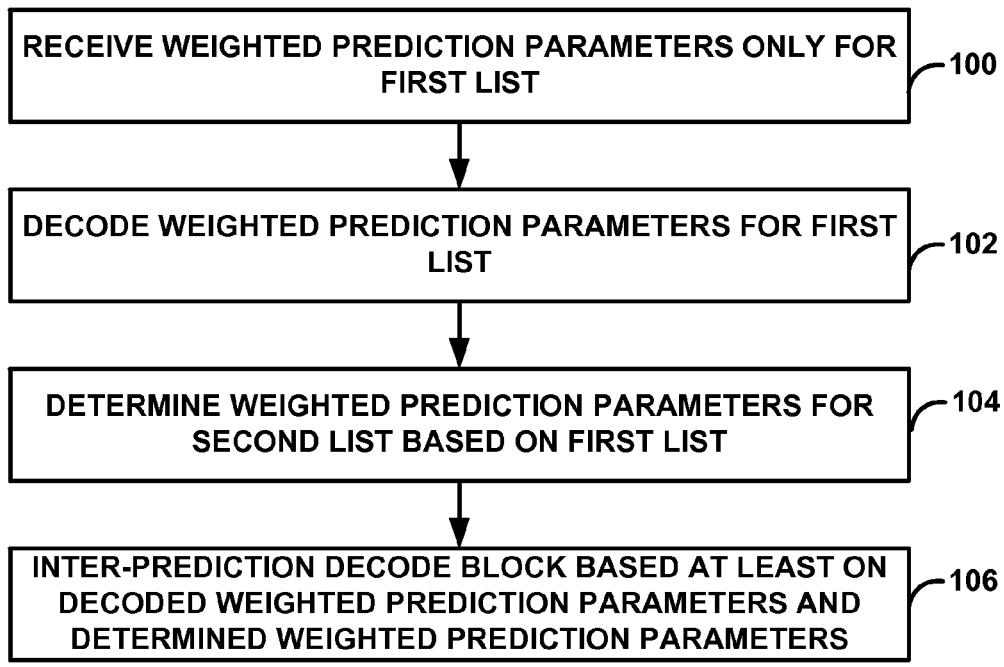
FIG. 6 is a flowchart illustrating exemplary operation of a video decoder in accordance with one or more examples described in this disclosure.

FIG. 6 is a flowchart illustrating an example operation of a video decoder in accordance with one or more techniques described in this disclosure. The techniques illustrated in FIG. 6 for a video decoder may be applicable to video decoder 30 or other types of video decoders.

The video decoder may receive, from the coded bitstream, weighted prediction parameters only for a first list (100). The video decoder may decode the weighted prediction parameters for the first list (102). The video decoder may determine the weighted prediction parameters for a second list based on the weighted prediction parameters for the first list (104). The video decoder may inter-prediction decode a block in the current picture based at least on one or more of the decoded weighted prediction parameters and the determined weighted prediction parameters (106).

In the example illustrated in FIG. 5 or FIG. 6, the first list includes reference pictures used for inter-predicting one or more blocks within a current picture, and the second list includes reference pictures used for inter-predicting one or more blocks within the current picture. Examples of the first list and the second list include RefPicListC, RefPicList0, and RefPicList1, where the first list and the second list are different.

In some examples, the video coder (e.g., the video encoder or the video decoder) may determine the weighted prediction parameters for the second list based only on the weighted prediction parameters for the first list. In some examples, the video coder may determine the weighted prediction parameters for the second list without coding the weighted prediction parameters for the second list.

The video coder may also code a syntax element indicating whether the first list and the second list are substantially equivalent (i.e., identical or when the first list is longer than the second list, and the first N entries of the first list are identical to the first N entries of the second list). In this example, the video coder may determine the weighted prediction parameter for the second list based on the first list when the syntax element indicates that the first list and the second list are substantially equivalent.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
constructing a first list and a second list, wherein the first list and the second list each include reference pictures used for inter-predicting one or more blocks of the video data within a current picture;
coding weighted prediction parameters for the first list, wherein the weighted prediction parameters define scaling factors by which pixel values within respective reference pictures in the first list are to be scaled for inter-predicting a block in the current picture;
coding a syntax element indicating that the first list is longer than the second list and that a first N entries of the first list are identical to a first N entries of the second list;
determining weighted prediction parameters for the second list based on the weighted prediction parameters for the first list and based on the syntax element indicating that the first list is longer than the second list and that the first N entries of the first list are identical to the first N entries of the second list, wherein the second list includes reference pictures used for inter-predicting one or more blocks within the current picture; and
inter-predicting the block in the current picture based at least on one or more of the weighted prediction parameters for the first list that are coded and the determined weighted prediction parameters for the second list.

2. The method of claim 1, wherein determining the weighted prediction parameters for the second list comprises determining the weighted prediction parameters for the first N entries of the second list based on the weighted prediction parameters for the first N entries of the first list, and based on no other weighted prediction parameters.

3. The method of claim 1, wherein determining the weighted prediction parameters for the second list comprises determining the weighted prediction parameters for the first N entries of the second list without coding the weighted prediction parameters for the first N entries of the second list.

4. The method of claim 1, wherein the first list comprises one of a combined reference picture list (RefPicListC), a first reference picture list (RefPicList0), or a second reference picture list (RefPicList1), and the second list is different than the first list.

5. The method of claim 1,
wherein coding weighted prediction parameters comprises decoding the weighted prediction parameters for the first list;
wherein coding the syntax element comprises decoding the syntax element indicating that the first list is longer than the second list and that the first N entries of the first list are identical to the first N entries of the second list; and
wherein inter-predicting comprises inter-prediction decoding the block in the current picture based at least on one or more of the decoded weighted prediction parameters for the first list and the determined weighted prediction parameters for the second list.

6. The method of claim 1,
wherein coding weighted prediction parameters comprises encoding the weighted prediction parameters for the first list;
wherein coding the syntax element comprises encoding the syntax element indicating that the first list is longer than the second list and that the first N entries of the first list are identical to the first N entries of the second list; and
wherein inter-predicting comprises inter-prediction encoding the block in the current picture based at least on one or more of the weighted prediction parameters for the first list that are encoded and the determined weighted prediction parameters for the second list.

7. The method of claim 1, the method being executable on a wireless communication device including a video coding device, the wireless communication device comprising:
a memory disposed within the video coding device to store the video data;
a processor configured to retrieve the video data from the memory to construct the first list and the second list, wherein the processor is further configured to code the weighted prediction parameters for the first list, code the syntax element, determine the weighted prediction parameters for the second list, and inter-predict the block in the current picture; and
at least one of a transmitter or a receiver configured to one of transmit the video data or receive the video data.

8. The method of claim 7, wherein the wireless communication device is a cellular telephone and the video data is transmitted or received by the at least one of the transmitter or receiver, respectively, and modulated according to a cellular communication standard.

9. A device for coding video data, the device comprising:
a memory to store the video data;
a video coder configured to:
construct a first list and a second list, wherein the first list and the second list each include reference pictures used for inter-predicting one or more blocks of the video data within a current picture;
code weighted prediction parameters for the first list, wherein the weighted prediction parameters define scaling factors by which pixel values within respective reference pictures in the first list are to be scaled for inter-predicting a block in the current picture;
code a syntax element indicating that the first list is longer than the second list and that a first N entries of the first list are identical to a first N entries of the second list;
determine weighted prediction parameters for the second list based on the weighted prediction parameters for the first list and based on the syntax element indicating that the first list is longer than the second list and that the first N entries of the first list are identical to the first N entries of the second list, wherein the second list includes reference pictures used for inter-predicting one or more blocks within the current picture; and
inter-predict the block in the current picture based at least on one or more of the weighted prediction parameters for the first list that are coded and the determined weighted prediction parameters for the second list.

10. The device of claim 9, wherein, to determine the weighted prediction parameters for the second list, the video coder is configured to determine the weighted prediction parameters for the first N entries of the second list based on the weighted prediction parameters for the first N entries of the first list, and based on no other weighted prediction parameters.

11. The device of claim 9, wherein, to determine the weighted prediction parameters for the second list, the video coder is configured to determine the weighted prediction parameters for the first N entries of the second list without coding the weighted prediction parameters for the first N entries of the second list.

12. The device of claim 9, wherein the first list comprises one of a combined reference picture list (RefPicListC), a first reference picture list (RefPicList0), or a second reference picture list (RefPicList1), and the second list is different than the first list.

13. The device of claim 9, wherein the video coder comprises a video decoder, and wherein the video decoder is configured to:
decode the weighted prediction parameters for the first list;
decode the syntax element indicating that the first list is longer than the second list and that the first N entries of the first list are identical to the first N entries of the second list;
determine the weighted prediction parameters for the second list based on the weighted prediction parameters for the first list; and
inter-prediction decode the block in the current picture based at least on the one or more of the decoded weighted prediction parameters for the first list and the determined weighted prediction parameters for the second list.

14. The device of claim 9, wherein video coder comprises a video encoder, and wherein the video encoder is configured to:
encode the weighted prediction parameters for the first list;
encode the syntax element indicating that the first list is longer than the second list and that the first N entries of the first list are identical to the first N entries of the second list;
determine the weighted prediction parameters for the second list based on the weighted prediction parameters for the first list; and
inter-prediction encode the block in the current picture based at least on the one or more of the weighted prediction parameters for the first list that are encoded and the determined weighted prediction parameters for the second list.

15. The device of claim 9, wherein the device comprises one of:
an integrated circuit;
a microprocessor; or
a wireless device that includes the video coder.

16. The device of claim 9, wherein the device is a wireless communication device, further comprising:
at least one of a transmitter or a receiver configured to one of transmit the video data or receive the video data.

17. The device of claim 16, wherein the wireless communication device is a cellular telephone and the video data is transmitted or received by the at least one of the transmitter or receiver, respectively, and modulated according to a cellular communication standard.

18. A non-transitory computer readable storage medium having instructions stored thereon that when executed cause one or more processors of a device for video coding to:
construct a first list and a second list, wherein the first list and the second list each include reference pictures used for inter-predicting one or more blocks within a current picture;
code weighted prediction parameters for the first list, wherein the weighted prediction parameters define scaling factors by which pixel values within respective reference pictures in the first list are to be scaled for inter-predicting a block in the current picture;
code a syntax element indicating that the first list is longer than the second list and that a first N entries of the first list are identical to a first N entries of the second list;
determine weighted prediction parameters for the second list based on the weighted prediction parameters for the first list and based on the syntax element indicating that the first list is longer than the second list and that the first N entries of the first list are identical to the first N entries of the second list, wherein the second list includes reference pictures used for inter-predicting one or more blocks within the current picture; and
inter-predict the block in the current picture based at least on one or more of the weighted prediction parameters for the first list that are coded and the determined weighted prediction parameters for the second list.

19. The computer-readable storage medium of claim 18, wherein the instructions that cause the one or more processors to determine the weighted prediction parameters for the second list comprise instructions that cause the one or more processors to determine the weighted prediction parameters for the first N entries of the second list based on the weighted prediction parameters for the first N entries of the first list, and based on no other weighted prediction parameters.

20. The computer-readable storage medium of claim 18, wherein the instructions that cause the one or more processors to determine the weighted prediction parameters for the second list comprise instructions that cause the one or more processors to determine the weighted prediction parameters for the first N entries of the second list without coding the weighted prediction parameters for the first N entries of the second list.

21. A device for coding video data, the device comprising:
means for constructing a first list and a second list, wherein the first list and the second list each include reference pictures used for inter-predicting one or more blocks of the video data within a current picture;
means for coding weighted prediction parameters for the first list, wherein the weighted prediction parameters define scaling factors by which pixel values within respective reference pictures in the first list are to be scaled for inter-predicting a block in the current picture;
means for coding a syntax element indicating that the first list is longer than the second list and that a first N entries of the first list are identical to a first N entries of the second list;
means for determining weighted prediction parameters for the second list based on the weighted prediction parameters for the first list and based on the syntax element indicating that the first list is longer than the second list and that the first N entries of the first list are identical to the first N entries of the second list, wherein the second list includes reference pictures used for inter-predicting one or more blocks within the current picture; and
means for inter-predicting the block in the current picture based at least on one or more of the weighted prediction parameters for the first list that are coded and the determined weighted prediction parameters for the second list.

22. The device of claim 21, wherein the means for determining the weighted prediction parameters for the second list comprises means for determining the weighted prediction parameters for the first N entries of the second list based on the weighted prediction parameters for the first N entries of the first list, and based on no other weighted prediction parameters.

23. The device of claim 21, wherein the means for determining the weighted prediction parameters for the second list comprises means for determining the weighted prediction parameters for the first N entries of the second list without coding the weighted prediction parameters for the first N entries of the second list.

24. A method for coding video data, the method comprising:
coding at least a first syntax element that indicates that a first N elements of a first reference picture list and a second reference picture list are the same;
based on the first N elements being the same, coding information of the video data that indicates a size of the first reference picture list and a size of the second reference picture list;
based on the size of the first reference picture list being greater than the size of the second reference picture list:
constructing the first reference picture list; and
deriving the second reference picture list from the first reference picture list; and
based on the size of the second reference picture list being greater than the size of the first reference picture list:
constructing the second reference picture list; and
deriving the first reference picture list from the second reference picture list.

25. The method of claim 24, further comprising:
based on the first N elements being the same and the size of the first reference picture list being greater than the size of the second reference picture list:
coding weighted prediction parameters for reference pictures identified in the first reference picture list, wherein the weighted prediction parameters for the reference pictures identified in the first reference picture list define scaling factors by which pixel values within respective reference pictures in the first reference picture list are to be scaled;
not coding weighted prediction parameters for reference pictures identified in the second reference picture list; and deriving the weighted prediction parameters for the reference pictures identified in the second reference picture list from the weighted prediction parameters for the first N reference pictures identified in the first reference picture list; and based on the first N elements being the same and the size of the second reference picture list being greater than the size of the first reference picture list:

coding weighted prediction parameters for reference pictures identified in the second reference picture list, wherein the weighted prediction parameters for the reference pictures identified in the second reference picture list define scaling factors by which pixel values within respective reference pictures in the second reference picture list are to be scaled;

not coding weighted prediction parameters for reference pictures identified in the first reference picture list; and deriving the weighted prediction parameters for the reference pictures identified in the first reference picture list from the weighted prediction parameters for the first N reference pictures identified in the second reference picture list.

\* \* \* \* \*